(12) United States Patent
Seelmann-Eggebert et al.

(10) Patent No.: US 10,899,932 B2
(45) Date of Patent: Jan. 26, 2021

(54) NON-AMPHOTERIC, QUATERNISABLE AND WATER-SOLUBLE POLYMERS FOR MODIFYING THE SURFACE CHARGE OF SOLID PARTICLES

(71) Applicant: BASF SE, Ludwigshafen (DE)

(72) Inventors: Hans-Peter Seelmann-Eggebert, Limburgerhof (DE); Tobias Urban, Bensheim (DE)

(73) Assignee: BASF SE, Ludwigshafen am Rhein (DE)

( * ) Notice: Subject to any disclaimer, the term of this patent is extended or adjusted under 35 U.S.C. 154(b) by 41 days.

(21) Appl. No.: 15/521,509

(22) PCT Filed: Oct. 23, 2015

(86) PCT No.: PCT/EP2015/074657
§ 371 (c)(1),
(2) Date: Apr. 24, 2017

(87) PCT Pub. No.: WO2016/062880
PCT Pub. Date: Apr. 28, 2016

(65) Prior Publication Data
US 2018/0118951 A1 May 3, 2018
US 2018/0334569 A9 Nov. 22, 2018

(30) Foreign Application Priority Data
Oct. 24, 2014 (EP) .................................. 14190359

(51) Int. Cl.
*C09C 3/10* (2006.01)
*C09C 1/44* (2006.01)
(Continued)

(52) U.S. Cl.
CPC .................. *C09C 3/10* (2013.01); *C09C 1/44* (2013.01); *C25D 3/12* (2013.01); *C25D 5/48* (2013.01);
(Continued)

(58) Field of Classification Search
CPC ..... C09C 1/44; C09C 3/10; C09C 3/12; C01P 2004/61; C01P 2004/62; C01P 2004/64;
(Continued)

(56) References Cited

U.S. PATENT DOCUMENTS 145,517 A 12/1873 Mears
1,972,961 A 9/1934 Tisdale et al.
(Continued)

FOREIGN PATENT DOCUMENTS

BE 611960 A1 7/1962
BE 793867 A1 7/1973
(Continued)

OTHER PUBLICATIONS

International Search Report issued in PCT/EP2015074657 dated Apr. 22, 2016.

*Primary Examiner* — Ciel P Contreras
(74) *Attorney, Agent, or Firm* — Armstrong Teasdale LLP

(57) ABSTRACT

The present invention relates to particles based on inorganic, organic compounds, sulfur and/or diamond, coated with a nonampholytic, quaternizable polymer which is water-soluble at 20° C., and also to their use. The invention likewise pertains to a method for depositing these disperse particles in a metallic phase on the surface of a substrate.

6 Claims, 1 Drawing Sheet electrodeposition of diamond particles with coating composed of a nonampholytic, quaternizable polymer (Lupasol® WF)

(51) Int. Cl.
*C25D 3/12* (2006.01)
*C25D 5/48* (2006.01)
*C25D 7/00* (2006.01)
*C25D 15/00* (2006.01)

(52) U.S. Cl.
CPC ............... *C25D 7/00* (2013.01); *C25D 15/00* (2013.01); *C01P 2004/61* (2013.01); *C01P 2004/62* (2013.01); *C01P 2004/64* (2013.01)

(58) Field of Classification Search
CPC ... C25D 3/12; C25D 5/48; C25D 7/00; C25D 15/00
See application file for complete search history.

(56) References Cited

U.S. PATENT DOCUMENTS

| | | |
|---|---|---|
| 2,317,765 A | 4/1943 | Hester et al. |
| 2,457,674 A | 12/1948 | Neuberger et al. |
| 2,504,404 A | 4/1950 | Flenner et al. |
| 2,526,660 A | 10/1950 | Hester et al. |
| 2,553,770 A | 5/1951 | Kittleson et al. |
| 2,720,480 A | 10/1955 | Wolf et al. |
| 2,791,605 A | 5/1957 | Dorman et al. |
| 3,017,415 A | 1/1962 | Sarett et al. |
| 3,248,400 A | 4/1966 | Oskar et al. |
| 3,249,499 A | 5/1966 | Von et al. |
| 3,290,353 A | 12/1966 | Battershell et al. |
| 3,296,272 A | 1/1967 | Howard et al. |
| 3,325,503 A | 6/1967 | Bimber et al. |
| 3,399,214 A | 8/1968 | Marshall et al. |
| 3,499,086 A | 3/1970 | Brueckner et al. |
| 3,631,176 A | 12/1971 | Klopping et al. |
| 3,657,443 A | 4/1972 | Klopping et al. |
| 3,903,090 A | 9/1975 | Fujinami et al. |
| 3,957,847 A | 5/1976 | Davidson |
| 4,052,395 A | 10/1977 | Jojima et al. |
| 4,079,062 A | 3/1978 | Van Reet et al. |
| 4,098,654 A | 7/1978 | Helle et al. |
| 4,302,374 A | 11/1981 | Helle et al. |
| 4,435,548 A | 3/1984 | Tomalia et al. |
| 4,568,737 A | 2/1986 | Tomalia et al. |
| 4,664,696 A | 5/1987 | Schaub |
| 4,996,157 A | 2/1991 | Smith et al. |
| 5,002,603 A | 3/1991 | Safir et al. |
| 5,026,417 A | 6/1991 | Kucey |
| 5,240,940 A | 8/1993 | Arnold et al. |
| 5,248,500 A | 9/1993 | Ayanaba |
| 5,338,532 A | 8/1994 | Tomalia et al. |
| 5,403,584 A | 4/1995 | Crawford et al. |
| 5,733,544 A | 3/1998 | Marrone et al. |
| 5,945,567 A | 8/1999 | Curtze et al. |
| 5,968,503 A | 10/1999 | Crawford |
| 6,376,548 B1 | 4/2002 | Mulvihill et al. |
| 6,406,690 B1 | 6/2002 | Peleg et al. |
| 6,890,525 B2 | 5/2005 | Hick et al. |
| 6,994,849 B2 | 2/2006 | Droby |
| 7,262,151 B2 | 8/2007 | Smith et al. |
| 8,206,972 B2 | 6/2012 | Hua |
| 8,221,736 B2 | 7/2012 | Hick et al. |
| 8,445,255 B2 | 5/2013 | Kloepper et al. |
| 2002/0161113 A1 | 10/2002 | Dvornic et al. |
| 2003/0069370 A1 | 4/2003 | Dvornic et al. |
| 2010/0260735 A1 | 10/2010 | Bais et al. |
| 2011/0023045 A1 | 1/2011 | Yates et al. |
| 2012/0034464 A1 | 2/2012 | Chakraborty et al. |
| 2012/0149571 A1 | 6/2012 | Kloepper et al. |
| 2013/0035230 A1 | 2/2013 | Suchanek |
| 2013/0236522 A1 | 9/2013 | Misumi |
| 2014/0051571 A1 | 2/2014 | Asolkar et al. |
| 2014/0086879 A1 | 3/2014 | Strobel et al. |
| 2014/0127520 A1 | 5/2014 | Schade et al. |
| 2014/0249031 A1* | 9/2014 | Mulqueen ............. A01N 25/28 504/359 |
| 2014/0256545 A1* | 9/2014 | Velev ............ A01N 59/16 504/100 |

FOREIGN PATENT DOCUMENTS

| | | |
|---|---|---|
| BE | 835579 A2 | 5/1976 |
| CA | 2471555 A1 | 12/2005 |
| CN | 1228393 C | 11/2005 |
| CN | 1939128 A | 4/2007 |
| CN | 100485118 C | 5/2009 |
| CN | 101605526 A | 12/2009 |
| CN | 102036773 A | 4/2011 |
| CN | 102066622 A | 5/2011 |
| CN | 102202502 A | 9/2011 |
| CN | 102906019 A | 1/2013 |
| DE | 642532 C | 3/1937 |
| DE | 682048 C | 10/1939 |
| DE | 1164152 B | 2/1964 |
| DE | 1193498 B | 5/1965 |
| DE | 1198125 B | 8/1965 |
| DE | 1209799 B | 1/1966 |
| DE | 1493736 A1 | 4/1969 |
| DE | 1901421 A1 | 8/1969 |
| DE | 1930540 A1 | 1/1970 |
| DE | 1567169 A1 | 8/1970 |
| DE | 1643347 A1 | 5/1971 |
| DE | 2207576 A1 | 8/1973 |
| DE | 2324020 A1 | 12/1973 |
| DE | 2324010 A1 | 1/1975 |
| DE | 2732257 A1 | 1/1978 |
| DE | 2752096 A1 | 6/1978 |
| DE | 2903612 A1 | 8/1979 |
| DE | 151404 A1 | 10/1981 |
| DE | 19534327 A1 | 2/1996 |
| DE | 19650197 A1 | 6/1998 |
| DE | 10021412 A1 | 6/2001 |
| DE | 10351401 A1 | 6/2005 |
| DE | 102004006304 A1 | 8/2005 |
| DE | 102005009458 A1 | 9/2006 |
| EP | 0015756 A1 | 9/1980 |
| EP | 0040345 A1 | 11/1981 |
| EP | 0049854 A2 | 4/1982 |
| EP | 0078663 A2 | 5/1983 |
| EP | 0115771 A2 | 8/1984 |
| EP | 0120321 A1 | 10/1984 |
| EP | 0141317 A2 | 5/1985 |
| EP | 0152031 A2 | 8/1985 |
| EP | 0210734 A1 | 2/1987 |
| EP | 0224339 A2 | 6/1987 |
| EP | 0226917 A1 | 7/1987 |
| EP | 0234242 A2 | 9/1987 |
| EP | 0234408 A2 | 9/1987 |
| EP | 0243970 A1 | 11/1987 |
| EP | 0253213 A1 | 1/1988 |
| EP | 0256503 A2 | 2/1988 |
| EP | 0262393 A1 | 4/1988 |
| EP | 0267778 A2 | 5/1988 |
| EP | 0278595 A2 | 8/1988 |
| EP | 0281842 A1 | 9/1988 |
| EP | 0307510 A2 | 3/1989 |
| EP | 0310550 A1 | 4/1989 |
| EP | 0133878 B1 | 3/1990 |
| EP | 0382375 A2 | 8/1990 |
| EP | 0398692 A2 | 11/1990 |
| EP | 0428941 A1 | 5/1991 |
| EP | 0460575 A1 | 12/1991 |
| EP | 0466133 A2 | 1/1992 |
| EP | 0472996 A1 | 3/1992 |
| EP | 0477631 A1 | 4/1992 |
| EP | 0545099 A2 | 6/1993 |
| EP | 0639574 A1 | 2/1995 |
| EP | 0802215 A1 | 10/1997 |
| EP | 0860438 A1 | 8/1998 |
| EP | 0532022 A1 | 3/1999 |
| EP | 0936213 A1 | 8/1999 |
| EP | 0585215 B1 | 9/1999 |
| EP | 1028125 A1 | 8/2000 |
| EP | 1035122 A1 | 9/2000 |
| EP | 1122244 A1 | 8/2001 |
| EP | 1201648 A1 | 5/2002 |
| EP | 1273633 A2 | 1/2003 |
| EP | 1331254 A1 | 7/2003 |

(56) References Cited

FOREIGN PATENT DOCUMENTS

| | | |
|---|---|---|
| EP | 1474461 A1 | 11/2004 |
| EP | 2100912 A1 | 9/2009 |
| EP | 2145986 A1 | 1/2010 |
| FR | 2254276 A1 | 7/1975 |
| FR | 2641277 A1 | 7/1990 |
| GB | 857383 A | 12/1960 |
| GB | 935981 A | 9/1963 |
| GB | 996264 A | 6/1965 |
| GB | 1218623 A | 1/1971 |
| GB | 1312536 A | 4/1973 |
| GB | 1364619 A | 8/1974 |
| GB | 1394373 A | 5/1975 |
| GB | 1467561 A | 3/1977 |
| GB | 2058059 A | 4/1981 |
| GB | 2098607 A | 11/1982 |
| JP | H09323984 A | 12/1997 |
| JP | H114514 A | 1/1999 |
| JP | 2002316902 A | 10/2002 |
| WO | 9102051 A1 | 2/1991 |
| WO | 9107481 A1 | 5/1991 |
| WO | 9314147 A1 | 7/1993 |
| WO | 9517806 A1 | 7/1995 |
| WO | 9601256 A1 | 1/1996 |
| WO | 9616048 A1 | 5/1996 |
| WO | 9619442 A1 | 6/1996 |
| WO | 9621358 A1 | 7/1996 |
| WO | 9635739 A1 | 11/1996 |
| WO | 9715552 A1 | 5/1997 |
| WO | 9727189 A1 | 7/1997 |
| WO | 9748684 A1 | 12/1997 |
| WO | 9846608 A1 | 10/1998 |
| WO | 9914187 A1 | 3/1999 |
| WO | 9924413 A2 | 5/1999 |
| WO | 9927783 A1 | 6/1999 |
| WO | 9942447 A1 | 8/1999 |
| WO | 0029404 A1 | 5/2000 |
| WO | 0046148 A1 | 8/2000 |
| WO | 0065913 A1 | 11/2000 |
| WO | 0140441 A2 | 6/2001 |
| WO | 0154501 A2 | 8/2001 |
| WO | 0156358 A2 | 8/2001 |
| WO | 0222583 A2 | 3/2002 |
| WO | 0240431 A2 | 5/2002 |
| WO | 03010149 A1 | 2/2003 |
| WO | 03011853 A1 | 2/2003 |
| WO | 03014103 A1 | 2/2003 |
| WO | 03016286 A1 | 2/2003 |
| WO | 03053145 A1 | 7/2003 |
| WO | 03057861 A2 | 7/2003 |
| WO | 03061388 A1 | 7/2003 |
| WO | 03066609 A1 | 8/2003 |
| WO | 03066702 A1 | 8/2003 |
| WO | 03074491 A1 | 9/2003 |
| WO | 2003016303 A1 | 9/2003 |
| WO | 2004049804 A2 | 6/2004 |
| WO | 2004083193 A1 | 9/2004 |
| WO | 2005063721 A1 | 7/2005 |
| WO | 2005087772 A1 | 9/2005 |
| WO | 2005087773 A1 | 9/2005 |
| WO | 2005106106 A1 | 11/2005 |
| WO | 2005120234 A2 | 12/2005 |
| WO | 2005123689 A1 | 12/2005 |
| WO | 2005123690 A1 | 12/2005 |
| WO | 2006015866 A1 | 2/2006 |
| WO | 2006087325 A1 | 8/2006 |
| WO | 2006087343 A1 | 8/2006 |
| WO | 2007006670 A1 | 1/2007 |
| WO | 2007082098 A2 | 7/2007 |
| WO | 2007090624 A2 | 8/2007 |
| WO | 2008098387 A1 | 8/2008 |
| WO | 2009090181 A2 | 7/2009 |
| WO | 2009115506 A2 | 9/2009 |
| WO | 2009126473 A1 | 10/2009 |
| WO | 2010069882 A1 | 6/2010 |
| WO | 2010080619 A2 | 7/2010 |
| WO | 2010085795 A2 | 7/2010 |
| WO | 2011012495 A1 | 2/2011 |
| WO | 2011022809 A1 | 3/2011 |
| WO | 2011028657 A1 | 3/2011 |
| WO | 2011067329 A1 | 6/2011 |
| WO | 2011077514 A1 | 6/2011 |
| WO | 2011079209 A1 | 6/2011 |
| WO | 2011109395 A2 | 9/2011 |
| WO | 2012018266 A1 | 2/2012 |
| WO | 2012064527 A1 | 5/2012 |
| WO | 2012135763 A1 | 10/2012 |
| WO | 2012168188 A1 | 12/2012 |
| WO | 2013007767 A1 | 1/2013 |
| WO | 2013010862 A1 | 1/2013 |
| WO | 2013024009 A1 | 2/2013 |
| WO | 2013024010 A1 | 2/2013 |
| WO | 2013029005 A1 | 2/2013 |
| WO | 2013032693 A2 | 3/2013 |
| WO | 2013047441 A1 | 4/2013 |
| WO | 2013047749 A1 | 4/2013 |
| WO | 2013087709 A1 | 6/2013 |
| WO | 2013092224 A1 | 6/2013 |
| WO | 2013110594 A1 | 8/2013 |
| WO | 2013127704 A1 | 9/2013 |
| WO | 2013138398 A1 | 9/2013 |
| WO | 2013162072 A1 | 10/2013 |
| WO | 2014029697 A1 | 2/2014 |
| WO | 2016001317 A1 | 1/2016 |
| WO | 2016062879 A1 | 4/2016 |
| WO | 2016062880 A2 | 4/2016 |

* cited by examiner

Fig. 1A): electrodeposition of diamond particles without surface coating
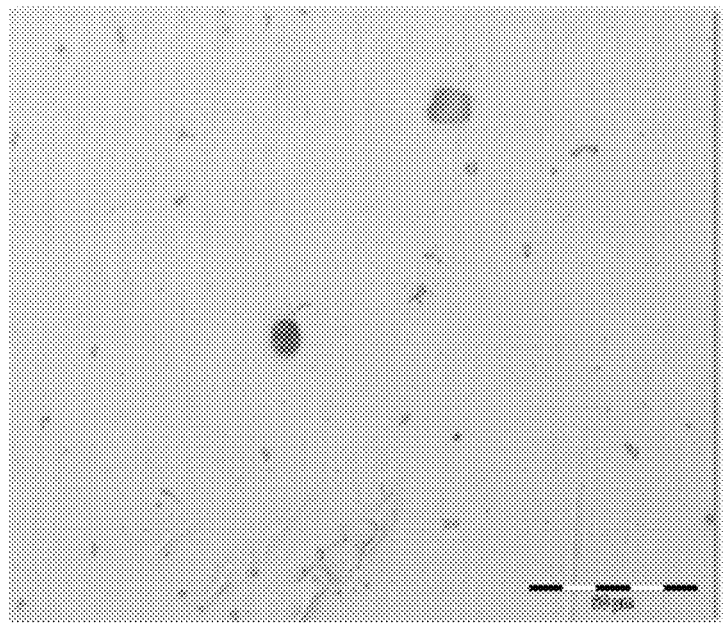
Fig. 1 B): electrodeposition of diamond particles with coating composed of a nonampholytic, quaternizable polymer (Lupasol® WF)
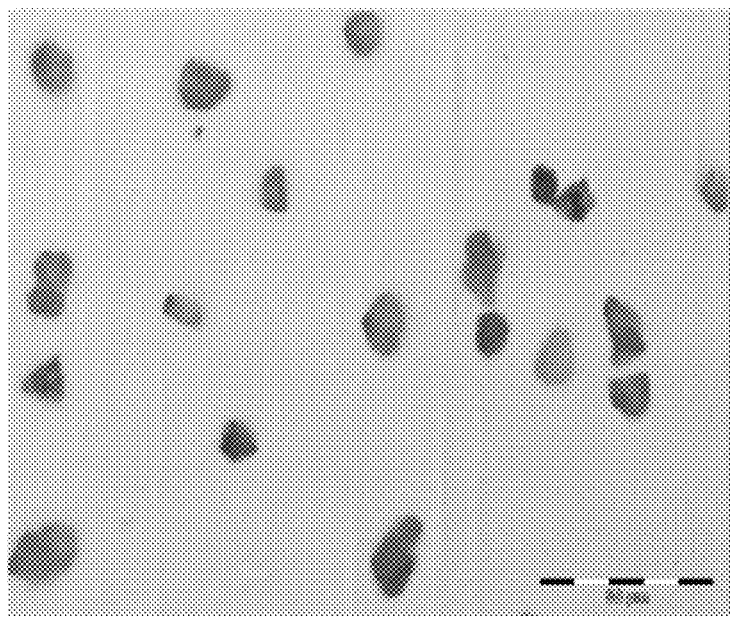

NON-AMPHOTERIC, QUATERNISABLE AND WATER-SOLUBLE POLYMERS FOR MODIFYING THE SURFACE CHARGE OF SOLID PARTICLES

CROSS-REFERENCE TO RELATED APPLICATIONS

This application is a U.S. National Phase Application of PCT/EP2015/074657, filed Oct. 23, 2015, which claims the benefit of priority to EP Application No. 14190359.1, filed Oct. 24, 2014, the contents of which are hereby expressly incorporated by reference in their entirety.

The present invention relates to the alteration of the surface charge of solid particles as measured via their zeta potential, and also to the use of particles modified accordingly for producing stable suspensions across a range of possible technical applications, as for example in electroplating processes, for producing grit in abrasive elements, as additives in lubricant compositions, in organic solvents, in polymeric materials, in crop protection formulations, in cosmetic and/or pharmaceutical formulations, as flotation assistants, for treating seed, for treating pesticides, or as assistants in aqueous slurries of clay minerals.

Diverse possible uses for solid particles which are dispersed in liquid, preferably aqueous, media are known in the art. Such uses include, for example, dyes which comprise dispersed pigments, but also dispersed fillers in polymers or dispersions in the sector of drugs, cosmetics, and detergents are known. In production of ceramics as well, clay dispersions (known as the slip) are used. Dispersions are likewise used in the flotation of ores, for example. Another industrial example of dispersions is found in the electroplating of metal surfaces (or of other surfaces prepared accordingly): for instance, boron nitride (BN), for example, is used in dispersed form in the electroplating bath in the nickel electroplating of metal surfaces, since together with the nickel, the BN then precipitates on the metal surface and enhances the physical properties of the nickel layer.

The energy for preparing a dispersion may be supplied, for example, chemically, electrochemically, electrically or mechanically (by grinding, by means of ultrasound, etc.). Dispersions have a fundamental tendency toward phase separation (sedimentation), and so stabilization with emulsifiers, surfactants or protective colloids is practiced during their production and storage. Alternatively, or in addition to this, there is also deliberate exploitation of the electrostatic repulsion of pigment and/or polymer particles of like charge (electrostatic stabilization).

A problem which frequently arises in practice is that the particles are difficult if not in fact impossible to disperse in an aqueous or other liquid medium. Interface-active substances are oftentimes used as dispersants for producing or stabilizing the dispersions. There is therefore an ongoing need for solid inorganic particles to be dispersed more effectively in liquids, preferably in aqueous media. The difficulty which occurs at the dispersal stage, i.e., at the stage of fine distribution of the solid particles in the liquid medium, is seen as being that the surface charge on the surface of the particles permits uniform incorporation into the solvent, preferably water, only partly or not at all.

There are already solutions known in the prior art, however. Thus U.S. Pat. Nos. 4,098,654 and 4,302,374 describe the use of nonionic surfactants for stabilization of PTFE particles. U.S. Pat. No. 145,517 describes chemical electroplating processes which use surfactants based on organic, nonfluorinated compounds in order to stabilize finely divided solids in an electroplating bath. There nevertheless continues to be a need not only to improve the stabilization of solid particles in the electroplating bath sector but also, generally, to optimize the dispersing behavior of solids within liquid media.

EP 2 100 912 A1 proposes modifying the surface of solid particles with specific polymers. The aim of this is said to be to convert the surface charge of solid particles, in turn improving the dispersing properties of the solid particles in liquid media. EP 2 100 912 A1 does this by using specific ampholytic polymers in which a cationic, quaternizable monomer component, especially 3-trimethylammoniopropylmethacrylamide chloride (MAPTAC), and an alkylacrylamide as second essential monomer component (especially N-isopropylacrylamide (NIPAM)) are polymerized with acrylic/methacrylic acid and/or with an anionic, ethylenically unsaturated carboxylic acid, especially 2-acrylamido-2-methylpropanesulfonic acid (AMPS), as third and/or fourth monomer components.

It has now surprisingly been found that nonampholytic, quaternizable polymers, instead of the specific ampholytic polymers already described in EP 2 100 912 A1, are outstandingly suitable for improving the dispersing properties of solid particles, preferably inorganic particles, in liquid and preferably in aqueous media. The conversion of the surface charge as a result of the nonampholytic, quaternizable polymers of the invention in this case takes place in fact to a greater extent by comparison with the specific ampholytic polymers already described earlier in EP 2 100 912 A1.

BRIEF DESCRIPTION OF THE DRAWINGS

FIG. 1A is an electrodeposition of diamond particles without a surface coating.

FIG. 1B is an electrodeposition of diamond particles with a coating composed of a nonampholytic, quaternizable polymer (Lupasol® WF).

DETAILED DESCRIPTION

The present invention therefore pertains, on the one hand, to the use of nonampholytic, quaternizable, water-soluble polymers for dispersing solid particles in liquid, preferably aqueous, medium.

In a first embodiment, the present invention relates to particles characterized in that the particles are coated on the surface with a nonampholytic, quaternizable polymer which is water-soluble at 20° C.

In a further, preferred embodiment, the present invention relates to the above-defined particles, wherein the particles are selected from the group of inorganic compounds, sulfur, diamond, and combinations thereof, preferably oxides, hydroxides, carbides, borides, sulfides, nitrides, sulfur, diamond, and combinations thereof.

In a further, preferred embodiment, the present invention relates to the above-defined particles, wherein the particles are selected from the group of organic compounds, preferably pesticides.

In a further, preferred embodiment, the present invention relates to the above-defined particles, wherein the polymer is selected from the group of polymers consisting of polyvinylamines, polyvinylamidoamines, polyethyleneimines, polypropyleneimines, polyamidoamines or polyureaamines, cationic copolymers comprising the polymerizable monomers vinylpyrrolidone, methacrylamide, vinylimidazole and quaternized vinylimidazole, cationic copolymers comprising the polymerizable monomers vinylpyrrolidone and quaternized vinylimidazole, cationic copolymers comprising the polymerizable monomers vinylpyrrolidone and quaternized dimethylaminoethyl methacrylate (DMAEMA), cationic copolymers comprising the polymerizable monomers vinylcaprolactam, vinylpyrrolidone and quaternized vinylimidazole, and also mixtures of these polymers and copolymers thereof.

In a further, preferred embodiment, the present invention relates to the above-defined particles wherein the particles have a diameter of between 10 and 0.00001 mm.

In a second embodiment, the present invention relates to a method for depositing a metal from an electrolyte onto the surface of a substrate, comprising the following steps:
providing a substrate with metal surface,
providing an electrolyte solution comprising a dissolved metal salt and particles as per the first embodiment of the present invention,
contacting the substrate with the electrolyte solution, and
depositing the metal, preferably by electroplating, from the dissolved metal salt, and a dispersion of the particles, on the surface of the substrate.

In a further preferred embodiment, the present invention relates to the above-defined method, wherein the electrolytic deposition is accomplished by electroplating.

In a further preferred embodiment, the present invention relates to the above-defined method wherein the metal salt comprises a nickel salt, preferably nickel sulfamate, and/or the deposition takes place without surfactant.

In a further embodiment, the present invention relates to the use of a polymer selected from the group of polymers consisting of polyvinylamines, polyvinylamidoamines, polyethyleneimines, polypropyleneimines, polyamidoamines or polyureaamines, cationic copolymers comprising the polymerizable monomers vinylpyrrolidone, methacrylamide, vinylimidazole and quaternized vinylimidazole, cationic copolymers comprising the polymerizable monomers vinylpyrrolidone and quaternized vinylimidazole, cationic copolymers comprising the polymerizable monomers vinylpyrrolidone and quaternized dimethylaminoethyl methacrylate (DMAEMA), cationic copolymers comprising the polymerizable monomers vinylcaprolactam, vinylpyrrolidone and quaternized vinylimidazole, and also mixtures of these polymers, for dispersing particles in a liquid, preferably aqueous, medium.

In a further preferred embodiment, the present invention relates to the above use wherein the particles have the polymer as a surface coating.

In a further preferred embodiment, the present invention relates to the above use wherein the particles are selected from the group of inorganic compounds, diamond, and combinations thereof, preferably oxides, hydroxides, carbides, borides, sulfides, nitrides, diamond, and combinations thereof.

In a further preferred embodiment, the present invention relates to the above use wherein the particles are selected from the group of organic compounds, preferably pesticides.

In a further preferred embodiment, the present invention relates to the above use wherein the particles are selected from the group consisting of boron nitride (BN), silicon carbide (SiC), boron carbide ($B_4C$), sulfur, diamond, and combinations thereof.

In a further preferred embodiment, the present invention relates to the above use wherein the particles have a diameter of between 10 and 0.00001 mm.

In a further preferred embodiment, the present invention relates to the above use wherein, after the particles have been dispersed in a liquid electrolyte solution comprising a dissolved metal salt, there is deposition, preferably electrodeposition, of the particles together with the metal on the surface of the substrate.

In a further preferred embodiment, the present invention relates to the above use wherein the deposition takes place by electroplating.

In a further embodiment, the present invention relates to the use of the particles of the invention in electroplating processes, as additive in lubricant compositions, as grit in grinding elements, preferably sanding disks, cutting wires and drills, in organic solvents, in polymeric materials, in crop protection formulations, in cosmetic and/or pharmaceutical formulations, as flotation assistants, for treating seed, for treating pesticides, or as assistants for the slurrying of clay minerals.

The term "particles" in accordance with the present invention pertains to particulate material which has only a relatively limited extent or particle diameter. The particles preferably treated with the polymers preferably exhibit a diameter of between 10 and 0.00001 mm, preference being given to particles having diameters of 1 to 0.0001 mm or 0.1 to 0.001 mm.

Also preferred are particles prepared using an aqueous solution of the polymer that has a weight fraction of polymer of 0.01 to 30 wt %, preferably of 0.1 to 15 and more particularly of 1 to 10 wt %, based in each case on the total weight of the aqueous solution.

The particles of the invention are preferably inorganic particles that are preferably solid at room temperature, i.e., 21° C., selected more particularly from the group of oxides, hydroxides, carbides, borides, sulfides or nitrides. Particularly preferred are the nitrides and carbides, with especial preference attaching to boron nitride (BN), silicon carbide (SiC) and boron carbide ($B_4C$). The particles are preferably nonmetallic, inorganic particles.

The particles of the invention here also include particles of diamond, i.e., particles of diamond are understood to be in accordance with the invention as part of the present invention, as well as (i.e., alternatively to) or together with the aforementioned inorganic particles; particles of diamond are also regarded as one particularly preferred embodiment of the present invention.

The particles of the invention may alternatively be organic particles, preferably particles solid at room temperature, i.e., 21° C., these particles being selected in particular from the group of inorganic compounds such as pesticides, for example.

The polymers according to the present invention are nonampholytic, quaternizable and water-soluble polymers.

The concept of the water-solubility of polymers at 20° C. relates to polymers of which at least 0.1 g of the polymer in question or of the polymer mixture is completely soluble in 100 ml of water at 20° C.

The term "ampholytic" relates to polymers which possess both acidic and basic hydrophilic groups at the same time, especially carboxyl and/or sulfonic acid groups as acidic groups and amino groups and/or amide groups as basic groups at the same time, and which are therefore able to exhibit acidic or basic behavior according to conditions.

In accordance with the above definition of the term "ampholytic", the present invention thus relates to nonampholytic polymers which therefore do not at the same time have acidic and basic groups, more particularly not carboxyl and/or sulfonic acid groups as acid groups and amino and/or amide groups as basic groups alongside one another at the same time. The concept of the groups in this context refers in particular to the side groups of the polymers in question.

The term "quaternizable polymer" refers to a polymer which has quaternizable amino or amide groups, more particularly quaternizable amino or amide groups as side groups, with a quaternizable amino or amide group or amino or amide side group being defined by the possibility of the latter group being converted in an alkylation reaction into a quaternary amino or amide group.

The latter condition expressly does not mean, however, that the quaternizable amino or amide groups must actually be already quaternized, in other words, in particular, alkylated, in the quaternizable polymers according to the present invention.

Instead it is the case that the quaternizable polymers according to the present invention do in fact also include these quaternizable polymers which are actually already quaternized, in other words, more particularly, are alkylated, preferably methylated, ethylated, propylated or butylated, but in addition the present invention, moreover, also includes the polymers which are or would be quaternizable only in principle in view of the presence of a corresponding (quaternizable) amino or amide group, but are not (yet) in that condition. The polymers of the invention must merely exhibit the possibility in principle of the alkylation on the nitrogen of the amino or amide group.

The nonampholytic, quaternizable polymers of the present invention, water-soluble at 20° C., comprise, in particular, two major groups of polymers which are regarded as preferred: firstly, polymeric amines, including more particularly polyamines in the narrower sense and polyalkyleneimines, and cationic, nonampholytic polymers soluble in water at 20° C., secondly.

a) Polymeric Amines (Polyamines, Polyalkyleneimines)

Suitable nonampholytic, quaternizable polymers in accordance with the present invention encompass, in a first preferred embodiment, polymeric amines, more particularly polyamines in the narrower sense, and polyalkyleneimines.

Preferred polyamines in the narrower sense include in particular the following polymers and polymer groups: polyvinylamines, polyvinylamidoamines, polyamidoamines, and polyureaamines. Preferred polyalkyleneimines encompass polyethyleneimines and polypropyleneimines.

Polymeric amines preferably have a weight-average molar weight (Mw) of 200 to 3 000 000, preferably of 200 to 2 000 000 g per mol. In general the amount of amino groups is 5 to 35 mol per kg, preferably 5 to 25 mol per kg, more preferably 10-24 mol per kg. The structure of the polymers may be selected such that they are linear, branched or hyperbranched polymers, star polymers or dendrimers.

Preferred in particular among the polyethyleneimines and polypropyleneimines are linear, branched or hyperbranched polymers. These include, in particular, homopolymers having 4, 5, 6, 10, 20, 35 and 100 repeating units.

Preferred polyethyleneimines are those of the general formula (I)

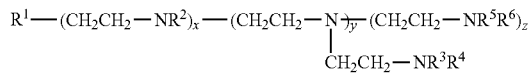

(I)

having an average molar mass (Mw) of 200 to 2 000 000, in which the radicals $R^1$ to $R^6$ independently of one another are hydrogen, linear or branched C1 to C20 alkyl, alkoxy, polyoxyethylene, hydroxyalkyl, (alkyl)carboxy, phosphonoalkyl or alkylamino radicals, C2 to C20 alkenyl radicals, or $C_6$ to $C_{20}$ aryl, aryloxy, hydroxyaryl, arylcarboxy or arylamino radicals, which optionally have further substitution, and $R^4$ and $R^5$, furthermore, are further polyethyleneimine polymer chains, and x, y and z independently of one another are each zero or an integer. $R^1$, moreover, may also be a primary amino group.

The sum total of x, y and z should be selected such that the average molar mass is within the specified range. Preferred ranges for the average molar mass (Mw) of the polyethyleneimines of the general formula I are 250 to 500 000, more particularly 300 to 100 000.

Preferred radicals $R^1$ to $R^6$ are hydrogen, methyl, ethyl, carboxymethyl, carboxyethyl, phosphonomethyl, 2-hydroxyethyl, 2-(2'-hydroxyethoxy)ethyl and 2-[2'-(2"-hydroxyethoxy)ethoxy]ethyl and, for $R^1$, a primary amino group.

Commercial polyethyleneimines are sold under tradenames including, for example, Lupasol® by BASF SE. Notable in particular here are the following commercial polyethyleneimines: Lupasol® FG, Lupasol® G20 waterfree, Lupasol® PR 8515, Lupasol® WF, Lupasol® FC, Lupasol® G 20, Lupasol® G35, Lupasol® G100, Lupasol® HF, Lupasol® P, Lupasol® PS, Lupasol® SK, Lupasol® SNA.

Regarding linear and branched polyethyleneimines, see also Römpp, Chemisches Lexikon, Online-Version 2004, Georg Thieme-Verlag, and the further literature specified therein.

Among the polyvinylamines and polyvinylamidoamines, linear polyvinylamines are particularly preferred. Polyvinylamines are general knowledge and are described for example in EP 0 071 050 A1. The present invention therefore refers directly to the polyvinylamines and polyvinylamidoamines and modes of preparation thereof in accordance with EP 0 071 050 A1, and all of the polyvinylamines and polyvinylamidoamines disclosed in EP 0 071 050 A1, along with their modes of preparation and relevant methods of determination and measurement, are incorporated into the subject matter of the present invention and considered part of the present invention.

Commercial linear polyvinylamines are sold for example under the tradename Lupamin® or Catiofast® by BASF SE. Especially noteworthy are the following commercial products: Lupamin® 9095, Lupamin® 9050, Lupamin® 9030, Lupamin® 9010, Lupamin® 5095, Lupamin® 1595.

Preferred polyvinylamines and polyvinylamidoamines for the present invention are polyallylamine, poly(diallyldimethylammonium chloride), polyvinylformamide, polyvinylpyrrolidone, polyvinylacetamide, polyvinylmethylformamide, polyvinylmethylacetamide, poly(dimethylaminopropylmethacrylamide), poly(dimethylaminoethyl acrylate), poly(diethylaminoethyl acrylate), poly(acryloylethyltrimethylannnnoniunn chloride), poly(acrylamidopropyltrimethylammonium chloride), poly(methacrylamidopropyltrimethylammonium chloride), polyacrylamide, poly(vinylpyridine), hexadimethrin bromide, poly(dimethylamine-co-epichlorohydrin), poly(dimethylamine-co-epichlorohydrin-co-ethylenediamine), poly(amidoamineepichlorohydrin), or copolymers which comprise N-vinylformamide, allylamine, diallyldimethylammonium chloride, N-vinylacetamide, N-vinylpyrrolidone, N-methyl-N-vinylformamide, N-methyl-N-vinylacetamide, dimethylaminopropylmethacrylamide, dimethylaminoethyl acrylate, diethylaminoethyl acrylate, acryloylethyltrimethylammonium chloride or methacrylamidopropyltrimethylammonium chloride in copolymerized form and optionally in cleaved form. Furthermore, the stated polymers may be used in cationic or else anionic form, and also as salts thereof. Preferred here are nonionic or cationic polyvinylformamides, polyvinylamine, polyacrylamide and poly(diallyldimethylammonium chloride). Particularly preferred are cationic polyvinylformamides or polyvinylamine.

Particularly preferred is a polyvinylamine of the general formula (II)

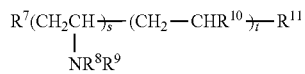

having an average molar mass (Mw) of 200 to 2 000 000, in which the radicals $R^7$ to $R^{11}$ independently of one another are hydrogen, linear or branched $C_1$ to $C_{20}$ alkyl, alkoxy, polyoxyethylene, hydroxyalkyl, (alkyl)carboxy, phosphonoalkyl and/or alkylamino radicals, $C_2$ to $C_{20}$ alkenyl radicals, or $C_6$ to $C_{20}$ aryl, aryloxy, hydroxyaryl, arylcarboxy or arylamino radicals, which optionally have further substitution, and also, moreover, are a formamidyl, pyrrolidonyl or imidazolyl radical, s is an integer and t is 0 or an integer, it also being possible for the stated polyvinylamine to be quaternizable at tertiary and/or extant free primary and/or secondary N atoms present in the compounds (II).

The sum total of s and t should be selected such that the average molar mass is within the stated range. Preferred ranges for the average molar mass (Mw) of polyvinylamines are 500 to 500 000, more particularly 800 to 50 000.

Preferred definitions of the radicals $R^7$ to $R^{11}$ are likewise those specified above for $R^1$ to $R^6$ in the general formula I.

Further polymers used are linear polyamidoamines and also branched or hyperbranched polyamidoamines, as described for example in U.S. Pat. No. 4,435,548, EP 0 115 771, EP 0 234 408, EP 0 802 215, in L. J. Hobson and W. J. Feast, Polymer 40 (1999), 1279-1297 or in H.-B. Mekelburger, W. Jaworek and F. Vögtle, Angew. Chemie 1992, 104, No. 12, 1609-1614.

Preferred polyamidoamines preferably have an average molar mass (Mw) of 500 to 1 000 000. They are obtainable, for example, by reaction of $C_2$ to $C_{10}$ dicarboxylic or tricarboxylic acids with poly($C_2$ to $C_4$ alkylene)polyamines having 2 to 20 basic nitrogen atoms in the molecule, in which the number of primary and/or secondary amino groups is suitable for the formation of amide and/or ester bonds with the carboxylic acid.

Particularly preferred ranges for the average molar mass (Mw) of the polyamidoamines are 800 to 800 000, more particularly 1000 to 100 000.

A further class of polymer used is that of polyureaamines containing amino groups. Preference is given to using polyureaamines containing branched or hyperbranched amino groups, of the kind described for example in EP 1 474 461, DE 10 351 401 and DE 10 2004 006 304, and also in EP 1 273 633, US 2002/0161113 or US 2003/0069370.

Dendrimeric or dendrimerlike amines or precursors thereof are, for example, N,N,N',N'-tetra-aminopropylalkylenediamine, the alkylene unit selected being preferably the ethylene or butylene unit, and these amines being identified customarily as N6 amines, measured on the basis of the number of nitrogen atoms, and also the dendrimeric amines preparable therefrom by amino propylation, such as N14, N30, N62 and N128 amine. These amines have an ethylenediamine or butylenediamine scaffold, the hydrogen atoms of which are substituted on the nitrogen by amino(n-propyl) radicals. The terminal amino groups in this case may in turn be substituted by corresponding aminopropyl groups (N14 amine), etc. Preparation processes for these amines are described in WO 96/15097, starting from ethylenediamine, and are included by the present invention. Likewise preferred examples of these amines are corresponding N-amines which are prepared starting from butylenediamine instead of from ethylenediamine as above. Latter compounds are described in WO 93/14147 and are included correspondingly by the present invention.

Other dendrimers or dendrimerlike amines may have a construction, for example, based on a polyamide chemistry as described for example in U.S. Pat. No. 4,568,737 or 5,338,532.

Another class of polymers containing nitrogen atoms are star polymers containing amino groups, of the kind described for example in WO 96/35739.

b) Cationic, Nonampholytic and Quaternizable Polymers (Luviquat)

Further suitable, nonampholytic and quaternizable polymers according to the present invention preferably comprise, in a second preferred embodiment, the following cationic, nonampholytic and quaternizable polymers:

copolymers comprising the polymerizable monomers vinylpyrrolidone, methacrylamide, vinylimidazole and quaternized vinylimidazole. Such polymers are known to the skilled person, for example, under the name Polyquaternium-68 and are available from BASF SE under the designation Luviquat® Supreme or Luviquat® Supreme AT 1.

Copolymers comprising the polymerizable monomers vinylpyrrolidone and quaternized vinylimidazole. Such polymers are known to the skilled person, for example, under the names Polyquaternium-16 and Polyquaternium-44 and are available from BASF SE under the designations Luviquat® HM 552, Luviquat® Style, Luviquat® Style AT 1, Luviquat® FC 370, Luviquat® FC 550, Luviquat® Excellence, Luviquat® UltraCare or Luviquat® Ultracare AT 1.

Copolymers comprising the polymerizable monomers vinylpyrrolidone and quaternized dimethylaminoethyl methacrylate (DMAEMA). Such polymers are known to the skilled person, for example, under the name Polyquaternium-11 and are available from BASF SE under the designation Luviquat® PQ 11 PN or Luviquat® PQ 11 AT 1.

Copolymers comprising the polymerizable monomers vinylcaprolactam, vinylpyrrolidone and quaternized vinylimidazole. Such polymers are known to the skilled person, for example, under the name Polyquaternium-46 and are available from BASF SE under the designation Luviquat® Hold and Luviquat® Hold AT 2.

The nonampholytic quaternizable polymers according to the present invention may optionally also be obtained by means of mixtures of polymers selected from the first preferred group of the polymers of the invention and the second preferred group of the polymers of the invention.

The particles of the invention having a coating on the surface with a nonampholytic, quaternizable polymer which is water-soluble at 20° C. are produced by contacting a carrier particle in an aqueous medium with a polymer of the invention. To this end the solid particles are contacted in an aqueous medium with a polymer as described above, the polymer itself being in the aqueous solution, and the polymer solution being mixed with the solid particles.

The suspension of the particles and the nonampholytic, quaternizable polymer which is water-soluble at 20° C. is preferably stirred thereafter, allowing the polymer to deposit on the surface of the particles. Here, preferably, the polymer is amassed on the particles only by physical forces in other words, there is and subsequently exists no chemical bond or linkage between the polymer and the particle. Stirring takes place preferably over a period of at least several hours, as for example of at least 2 h, 5 h, 10 h or 24 h. Particularly preferred for a maximum degree of surface modification of the particles by the polymer is at least 2 h, or very preferably 5 h, of stirring.

Following the treatment, the particles are separated from the solution, by filtering or centrifugation, for example, and the isolated particles are thereafter optionally washed with water until the washed solution is pH-neutral, and are dried. Also conceivable and in accordance with the invention, however, is for the particles to be left in dispersion in the aqueous polymer solution and used further in that form.

In the treatment of the solid particles, the polymer is preferably dissolved at a temperature of 10 to 90° C., preferably 15 to 35° C. and in particular at 18 to 30° C.

A further embodiment of the present invention claims a method which, for the deposition of a metal from an electrolyte onto the surface of a substrate, comprises the following steps:
providing a substrate with metal surface,
providing an electrolyte solution comprising a dissolved metal salt and the particles of the invention,
contacting the substrate with the electrolyte solution, and
depositing the metal from the dissolved metal salt and a dispersion of the particles on the surface of the substrate.

This method of the invention allows disperse particles to be deposited on a metallic phase on the surface of particles with high uniformity and density.

Suitable metals from which the metallic salts are derived in accordance with the present invention are the following metals: nickel, iron, chromium and cobalt, with nickel being preferred. A particularly preferred nickel salt is a salt selected from the group consisting of $NiCl_2$, $NiSO_4$, nickel sulfamate, and combinations thereof.

Suitable counterions to these metals are the anions selected from the group of sulfates, chlorides, fluoroborates, sulfamates, methanesulfonates, and combinations thereof.

The substrate on which the metallic phase, preferably nickel phase, is deposited has in particular a metallic surface. The substrate itself is likewise preferably a metal.

According to the production method of the present invention, it is preferred for the electrolyte solution further to comprise an inorganic salt. Suitable inorganic salts are, in particular, representatives from the group consisting of NaCl, KCl, $NH_4Cl$, and combinations thereof. It is optional, moreover, for the electrolyte solution further to comprise an organic acid, preferably acetic acid. Additionally, or alternatively, boric acid may be used. The technical advantage of the organic acid lies in the buffering of the electrolyte solution. Preference is additionally given to operating with use of an inorganic acid, such as sulfuric acid or hydrochloric acid, for example, in order thereby to establish the preferred acidic pH range.

In one particularly preferred embodiment of the production method claimed, the electrolyte solution comprises at least one nickel salt, at least one organic acid, and at least one inorganic phosphorus compound.

In order to ensure good particle stability, the electrolyte solution preferably at room temperature has a pH of between −1 and 14, more particularly between 0 and 13, very preferably between 2 and 7, and especially preferably between 3 and 5.

In the providing of the electrolyte, the electrolyte solution is admixed with the above-described particles. These particles may be preferably in solid form or the form of a suspension, preferably a suspension in aqueous solution. The particles are present preferably at a concentration of 0.1 to 400 g/l, more preferably of 10 to 300 g/l, very preferably of 50 to 200 g/l, and most preferably of 100 to 400 g/l.

The particles of the invention may advantageously be used at an extremely high concentration, without the particles agglomerating in the electrolyte solution. In this way, the deposition rate of the particles is increased and the products can be obtained with an elevated production rate.

In the subsequent step, the electrolyte solution is contacted with a substrate. Contact may take place, for example, by immersing a substrate into an electrolyte solution.

In a later step, the particles are deposited on the substrate. The deposited phase comprises the metal from the dissolved metal salt, and a dispersion of the particles having a coating with the polymer on the substrate. The metal may be deposited by reducing the metal salt to elemental metal. The deposition of the particles whose surface has been modified beforehand with the polymer of the invention on the substrate may take place in a simple way by opposition after immersion. This type of deposition corresponds to chemical reduction of the metal salt on the corresponding surface.

In one preferred embodiment of the method of the invention for depositing the metal from an electrolyte on the surface of a substrate in the presence of the particles of the invention, the electrolytic deposition takes place by electroplating.

Electroplating generally is understood as the electrochemical surface treatment of materials, i.e., the electrolytic deposition of metallic (or, less often, nonmetallic) thin layers for the purpose of esthetic enhancement, protection from corrosion, the generation of composite materials having improved properties, and the like. Electroplating comprises the two main fields of electrotyping and galvanoplasty. Galvanoplasty is used for producing or reproducing articles by electrolytic deposition. First of all, starting from the original shape, an impression (negative, hollow mold) is produced from plaster, wax, gutta-percha, silicone rubber, low-melting metal alloys, etc. The casting is made superficially electrically conducting (by chemical deposition or vapor deposition of metals) and then, as the negative pole in the electroplating fluid, is coated with the metal to be deposited (e.g., Cu, Ni, Ag etc.; positive pole). After the end of the electrolysis, the metal layer formed can be lifted from the mold and optionally filled out with filling material for reinforcement. Relevant in this context are the use thereof for producing print media in relief printing, for the copying of art objects, the production of record molds, and other technical casting molds.

In contrast, the unequally more important electrotyping, also known as electroplating, is a method for the coating of articles with usually very thin, protective and decorative coatings of silver, gold, nickel, chromium, copper and the like on less valuable substrates (e.g., of iron) by means of electrical current. Examples are silver plating, gold plating, chromium plating, and so on. A distinction is made between "electroless" methods, which operate with chemical reducing agents, and electrolytic methods ("electroplating").

If the article to be plated is electrically nonconducting, it must be rendered conducting. The articles may also be metallized under reduced pressure (ion plating) or from melts. Also known is the provision of nucleators, such as palladium chloride, for example, to surface cavities of electrically nonconducting materials. Electroplating in the widest sense also includes, among others, preparatory processes, such as chemical and electrolytic degreasing, pickling, polishing (especially so-called electropolishing), and coloring, and particularly the chemical deposition of metal layers and oxide layers. In order to achieve a well-adhering electroplated deposit, the workpieces to be electroplated must be thoroughly cleaned and treated with the metal degreasing agents before being introduced into the electroplating bath.

Electroplating baths are subdivided into acidic and alkaline baths. The acidic baths contain sulfates, chlorides, fluoroborates, methanesulfonates, and sulfamates of the metals to be deposited, whereas the alkaline baths are constructed on the basis of hydroxo and/or cyano complexes or diphosphates. In the case of bright electroplating, which is a further development, use of particular additives which have a leveling effect (brightener additives) produces a lustrous electroplated coating immediately, in many cases rendering subsequent polishing superfluous. The reprocessing of spent electroplating baths and the removal of surfactant, metal, salt and acid residues from the wastewater serve not only for recovery of valuable raw materials (recycling) but also for water cleanliness and hence environmental protection.

Given that the deposition of particles from dispersion in metal layers takes place under chemically extreme conditions, as for example very low or very high pH values and high salt loads in the electrolyte, the majority of surface-active surfactants are out of the question from the outset. In particular, the surfactants needed to produce dispersion deposits are therefore often aromatic surfactants or fluorinated surfactants, and on account of their very robustness they impose a considerable burden on the environment.

In a further preferred embodiment of the method of the invention, therefore, the disperse particles may be deposited as part of a surfactant-free method, i.e., the electroplated or autocatalytic deposition of metal on metallic surfaces in the presence of the particles of the invention takes place in the absence of the otherwise customary surfactants.

In order to achieve maximally efficient deposition of the particles together with the metal ions of the electrolyte solution on the substrate, in an electrodeposition, for example, the concentration ratio between the particles and the metal ions of the electrolyte solution at deposition is preferably in a range between 1:1 and 1:100, more preferably in a range between 1:5 and 1:50, and very preferably in a range from 1:10 to 1:40.

The term "ratio" here denotes a proportion of the concentrations of the respective substances. At a ratio of 1:1, the same concentrations of particles and of metal ions are used; at a ratio of 1:100, the metal ions are used in a hundred-fold concentration excess over the concentration of the particles.

The electrodeposition of the particles and of the metal ions of the electrolyte solution as metal atoms of the matrix on the substrate may take place with particular advantage when the current density used for the deposition is preferably in a range between 0.1 and 20 A/dm$^2$, more preferably between 0.2 and 10 A/dm$^2$ and especially between 0.25 and 8 A/dm$^2$. To achieve the aforesaid preferred current densities, different voltages are required, depending on the distance between the electrodes used for the deposition.

In order to be able to carry out the deposition of the particles and of the metal ions of the electrolyte solution on the substrate with particular advantage, deposition is carried out preferably at a temperature between 5 and 95° C., more preferably between 15 and 70° C., and especially between 30 and 50° C.

The pH during the method is preferably in the region of <1 to 14, preferably between 1 and 14, and, especially in electroplating baths, may with particular preference be in the acidic range between 1 and less than 7, in that case more particularly in the range from 1 to 5 and advantageously in the range from 1 to 3. This distinguishes the method of the invention advantageously from the prior art, which uses surfactants, which in general are no longer stable under such extreme conditions.

Preference is given, moreover, to those particles prepared using an aqueous solution of the polymer with a weight fraction of polymer of preferably from 0.01 to 30 wt %, more preferably from 0.1 to 15 and very preferably from 1 to 10 wt %, based in each case on the total weight of the aqueous solution.

The particles may be deposited with a relative movement between the substrate and the electrolyte solution. The relative speed between electrolyte solution and substrate may be preferably 0 to 15 m/s, more preferably between 0.1 to 5 m/s, and very preferably between 0.1 to 2 m/s.

In one preferred form of the metal deposition of the invention, for example, metallic surfaces are nickelized in the presence of the disperse particles in accordance with the present invention. In this case, an aqueous nickel solution, i.e., an aqueous solution of at least one nickel salt, nickel sulfamate for example, preferably further comprising an organic acid, preferably acetic acid and/or boric acid, and optionally an inorganic phosphorus compound, as for example sodium hypophosphite monohydrate, is admixed with an aqueous dispersion of the particles of the invention, as for example boron-nitride (preferably hexagonal BN), boron carbide, silicon carbide and/or diamond particles, produced in accordance with the present invention, and this solution is then contacted with the metallic surface until a dispersion layer of nickel and the particles of the invention has deposited thereon. Analogously, disperse particles in alternative metallic phases instead of nickel can also be deposited.

A property of the above-described nonampholytic, quaternizable, and water-soluble polymers is that of reversing the surface charge of solid particles, as measured, for example, via the zeta potential of an aqueous dispersion of said particles.

Measuring the zeta potential is a common technique for characterizing solid/liquid dispersions. Dispersed particles may become electrically charged, as a result of adsorption and ions on their surface, for example. On the surface of these electrically charged particles, an electrical double layer is consequently formed, this layer being firmly connected to the particles and resulting in an apparent increase in volume. This fixed layer is surrounded by a mobile and diffuse ion layer.

The potential $\psi_0$ at the particle surface then drops linearly within the fixed ion layer of thickness $\delta$ to a value of $\psi_\delta$, before going back almost exponentially to a value of 0 in the diffuse layer. The potential difference between the inner fixed ion layer, $\psi_\delta$, and the point within the diffuse ion layer at which the potential has gone back to $1/e\cdot\psi_\delta$ is referred to as the zeta potential.

The zeta potential can be determined directly from the direction and velocity of migration of the dispersed particles in an electrical field, on the basis of the following relation:

$$\zeta = \frac{f\cdot\pi\cdot v\cdot\eta}{E\cdot\varepsilon}$$

$\zeta$=zeta potential (in mV)
$\varepsilon$=dielectric constant of the dispersion medium
$v$=electrophoretic migration velocity (in cm/s)
$\eta$=viscosity of the dispersion medium (poise, 1 poise=0.1 Pa·s)
E=field strength (in mV)
f=numerical factor (friction factor), dependent on the shape of the particles, their conductivity, and the size of the particles in comparison to the thickness of the diffuse double layer The migration velocity here is measured, depending on the size of the particles under investigation, either by means of observation through a light microscope or, particularly in the case of relatively small particles, by means of laser correlation spectroscopy.

The polymers used in accordance with the invention cause the particles treated in each case to undergo a reversal of charge at the surface, from a positive to a negative charge value, for example, or less preferably vice versa. Preference is given to changes for a negative to a positive zeta potential of the particles.

On the basis of these effects, the present invention allows the production of highly stable dispersions in liquid media on the basis of the coated particles, which may be inorganic or, alternatively, organic in nature. These dispersions may additionally be utilized in order to achieve maximally dense and uniform distribution of the disperse particles when these particles are subjected to deposition reactions on surfaces. From the claimed art with regard to the deposition of dispersions on surfaces, therefore, a range of technically important fields of application additionally emerge, in which the art described herein can be used.

For example, the solid particles of the invention with their charges reversed accordingly at the surface, and the aqueous dispersions of such particles, can be used in electroplating processes (electrolytic or chemical), as additives in lubricant compositions, for producing grit in abrasive elements, in organic solvents, in pharmaceutical preparations, in cosmetic products and formulations, or as flotation assistants, in crop protection formulations and/or for treatment of seed and/or pesticides. Such particles may find application, moreover, in the matrix of polymeric materials (thermoplastic or thermosetting polymers), preferably in the context of dispersed fillers in polymers, or they may be employed as assistants for the aqueous slurrying of clay minerals.

The latter relates to the production of what is called the slip which is used in order to produce ceramic materials, preferably porcelains. Principal raw materials or ceramics are clay minerals (clay, kaolin). Whereas the kaolins, usually from primary deposits, must be freed from coarse fractions by slurrying before being processed, the clays, already naturally slurried from secondary deposits, can often be processed in the form in which they are recovered from the earth. Additives used are opening materials for reducing the shrinkage on drying and firing (e.g., quartz, sand, ground baked clay=shamotte), fluxing agents for lowering the sintering temperature (e.g., Feldspat), and, optionally, colorants (certain metal oxides—see ceramic pigments). In the case of dry processing and semiwet processing, all of the mixing components are dried, optionally comminuted, and mixed, and are remoistened with wet steam or water, as and when required, for shaping. In the case of wet processing, the raw materials are subjected to wet grinding in tumble mills or are converted to aqueous suspensions by stirring together with water in mixing beaters. This fluid slip, as it is called, can be further-processed by casting or can be dewatered to a plastically deformable state in chamber filter presses, for example. Using the water-soluble polymers in the sense of the technical teaching described here leads to improved stabilization of the clay particles in the slip, with the method of the invention permitting, for example, spray-drying for reducing the transport quantity, and permitting redispersion of the thus-coated clays at the site of use. With particles thus coated, furthermore, it is possible to set higher solids contents in the suspension for a given fluidity, thus not only lowering the amount of water to be evaporated and hence the energy consumption during drying, but also improving the working.

A further field of application for the teaching of the invention is that of flotation. Flotation, as is known, is a separation method for the processing of ores, coal, salts or wastewaters. Flotation is also employed in the context of deinking in the recycling of paper. Flotation makes use of the difference in interfacial tension of solids relative to liquids (usually water) and gases (usually air)—i.e., the different wetting of particles suspended in water; participating at the interfaces are phenomena of adhesion, of the zeta potential, and, generally, of the electrochemical double layer. For example, metal sulfides, many metal oxides, heavy metals, carbon, and diamond are easily wetted by water-repellent (hydrophobic) substances such as aliphatic or aromatic hydrocarbons, whereas the gangue (dead rock), namely quartz, silicates, phosphates, sulfates, carbonates, halides and the like are easily wetted by water and hydrophilic substances.

Flotation is based on the concept that wetted particles sink, whereas unwetted particles—for a particle size between 10 and 500 μm—attach to air bubbles passed through the suspension (turbidity), migrate to the surface (creaming), and can be removed together with the froth. The wettability of the substances to be separated can be influenced in a targeted way through additions of flotation assistants. These are understood as chemicals which enhance the wettability of the various mineral surfaces. This function can also be exerted by the polymers for inventive use, as described above. Solid particles wetted with the polymers are capable of improving flotation processes by facilitating, for example, the separation of the solids from the aqueous phase, and thus, for example, increasing the yield of floated substances.

A further major field of application for the particles of the invention and the method of the invention concerns the production of particulate grit or abrasive elements, by finely divided deposition of the particles of the invention, as grit (abrasive), so to speak, on an abrasive body.

The particles according to the present invention are used as grit material in grinding elements preferably for three fundamental ways of working material, namely firstly for grinding, secondly for cutting, and thirdly for drilling, with grinding being understood as all related ways of working such as, for example, smoothing, polishing, fine-grinding, decorative grinding, deburring, cleaning, ablating, descaling, sanding and/or filing, whereas cutting refers to all related ways of working such as, for example, dicing, sawing, etc., and drilling includes all related modes of working, as for example drilling, screw drilling, profile drilling and thread drilling, boring, countersinking and reaming. Other ways of working material encompassed by the present invention are lapping (in wafer production for semiconductors and/or solar cells, for example) and honing (in the area of cylinder grinding, for example).

The grinding product may in one preferred embodiment be in the form of a disk (disk-form), a wire (wire-form) or a drilling head, where disk-form grinding elements can be used for grinding in the narrower sense, including surface grinding, cylindrical grinding and roller grinding, wire-shaped grinding elements are suitable in particular for cutting, i.e., severing, of articles of any kind, and drill heads are used for drilling.

Preferred in particular is an electrically conducting grinding product. Particularly preferred is an electrically conducting grinding product which consists of metal. This applies especially to wire-form grinding products and to grinding products which constitute drill heads, but also to disk-shaped grinding products. Especially preferable for the grinding product, more particularly wire-form grinding products or drill heads, but also for disk-form grinding products, is a metal selected from the group consisting of cobalt, nickel, iron, chromium, and combinations thereof.

Disk-form grinding products in particular, but also wire-form grinding products, may also consist of nonmetallic materials. Especially suitable are ceramic materials; the latter are used, as is known, in great diversity for the manufacture of sanding disks.

Disk-form grinding products are used for producing disk-form grinding elements. Preferred grinding elements can be used in a host of different applications. Grinding applications according to the present invention include external cylindrical grinding, especially inclined plunge grinding, straight plunge grinding, centerless grinding, and longitudinal grinding; tooth profile grinding, especially roller grinding and profile grinding; and flat grinding, especially deep grinding, flat grinding with segments, and flat grinding for guide tracks. Further preferred grinding elements comprise internal cylindrical grinding, thread grinding, tooth profile grinding, tooth profile honing, tool grinding, and rough grinding.

A further, particularly preferred grinding product in accordance with the present invention may take the form of a wire and be used, based on the method of the invention, for the deposition of the particles of the invention, which are deposited so to speak as the grit (abrasive material) on the wire.

Wire-form grinding products are therefore used in accordance with the present invention, with the particles of the invention, preferably for producing wire-form grinding elements, especially wire saws in any of a very wide variety of versions and fields of application. Wire-form grinding elements such as wire saws are used for the cutting, sawing and severing of objects and articles such as, for example, cables, pipes, plates, blocks, columns, bars, threads, rods, and the like.

A grinding element in the form of a wire may be used for example in a wire saw as the sawing element. Wire saws of this kind are used, for example, for cutting up blocks of individual silicon crystals in order to produce thin wafers which can be used in microelectronics, optics or photovoltaics.

The grinding element in the form of a wire preferably comprises at least one metal selected from the group consisting of iron, nickel, cobalt, chromium, molybdenum, tungsten, and alloys thereof. Used with particular preference is a chromium-nickel steel. Suitability is possessed for example by material types 1.4310, 1.4401, 1.4539, 1.4568 and 1.4571 (designation according to DIN 17224).

Wire-form grinding products preferably have a cylindrical shape characterized by a longitudinal axis and a circular cross section perpendicular to said axis. The wire-form grinding elements producible accordingly, in the form of wire saws, which may be further adapted for the particular utility, are obtained by selecting, for example, wires as grinding products with noncircular cross section for example, the cross section may preferably be oval, flat, non-flat, tetragonal, square, trapezoidal or lower-order polygonal. By "flat" is meant that the wire has a high aspect ratio, a rectangular cross section, such as a strip, having for example a characteristic length and a characteristic width, the width being less than around 10% of the length.

The wire-form grinding products may likewise take the form of structured wires, as for example ribbed wires, or of continuous wire loops.

An important technical requirement for wire-form grinding elements, especially for wire saws, and particularly for the cutting of expensive materials such as ceramic wafers, semiconductor wafers, wafers for solar cells, sapphire disks or nonmetallic ceramic materials, relates to the cross section of the wire, which should be as small as possible in order as far as possible to minimize the cutting kerf losses.

The diameter of wire-form grinding elements according to the present invention lies in its greatest dimension in the range from 50 to 750 µm, preferably from 80 to 500 µm, and especially preferably from 150 to 250 µm.

Wire-form grinding elements produced using the particles according to the present invention find their application, alternatively, also for the cutting of rocks, minerals, building materials, plastics, timbers, or similar substances, such as, for example, in applications including mining, the construction industry or the wood-processing industry.

Other important fields of application in which the wire-form grinding elements produced using the particles according to the present invention can be used include the cutting of metals, silicon and glass, including in particular optical glasses and specialty glasses such as sapphire glasses, for example.

The cutting of metals relates to metallic materials in any of a wide variety of forms, including tubes, wires, cables, foils, sheets, vehicle bodies, etc., while metal-based materials include a very wide variety of alloys and steels, including pure metals and alloys of the various heavy metals, light metals, noble metals and semimetals, including iron, manganese, nickel, copper, cobalt, zinc, tin, tungsten, tantalum, hafnium, niobium, gold, silver, lead, platinum, chromium, vanadium, molybdenum, titanium, aluminum, and also brass and others.

The wire-form grinding elements produced using the particles according to the present invention are suitable, for example, for the cutting of optical glasses which can be used, for example, in the production of lenses, prisms and mirrors.

Grinding elements in the form of drills encompass wood drills, multi-spur bits, cylinder head drills, gimlets, screw head drills, twist drills, with the corresponding drill head of such drills and bits consisting usually of metal, as for example steel or hard-metals. Besides the particle materials already stated above, in the case of drill heads it is possible in particular to use titanium aluminum nitrides, titanium carbon nitrides and/or titanium nitrides, producing preferably high hardness and wear resistance.

Another use according to the present invention is therefore the use of the particles of the invention as abrasive grit for the grinding, i.e., grinding in the narrower sense, cutting, and drilling of articles of any kind, the particulate abrasive grit being in dispersion in a metallic phase on the surface of the grinding element of the invention, and the particles having a coating of the polymer of the invention.

In coarse applications it is possible to use a single-stranded metal wire, or a wire may be braided together from a number of metal strands, to give a cable or rope having the desired overall cross section.

In another preferred embodiment, the grinding element has microstructures, with the microstructures being formed of the abrasive grit located on the grinding product.

The grinding element may have microstructures which overlap one another, which are separated from one another at a distance, and combinations thereof.

The microstructures may have the same height or varying heights; the peaks of the microstructures are preferably located in substantially the same plane. For circular grinding-article applications of the pad type, the height of the microstructures may vary over a radius. The height of the microstructures is preferably not more than 200 micrometers, more preferably about 25 to 200 micrometers.

Useful microstructures have precisely designed and irregularly shaped microstructures. Suitable microstructure designs have, for example, cuboidal, cylindrical, prismatic, pyramidal, truncated-pyramidal, conical, truncated-conical or other truncated forms, elevated transverse regions, X-shaped regions, rod-shaped with a substantially flat upper surface, hemispherical, and combinations thereof. The microstructure, if included in cross section in one plane of the microstructure that lies parallel to the working surface of the grinding article, may also define a wide variety of designs, comprising for example a circle, an ellipse and a polygon, comprising for example a triangle, square, rectangle, hexagon, heptagon and octagon.

The microstructures may also have sides which lie at right angles to the backing of the grinding element; sides which run with decreasing width in the direction of the backing of the grinding element and away from the more rigid substrate; sides which are undercut; and combinations thereof.

The microstructures may be arranged on the substrate in a diversity of configurations, comprising, for example, repeating patterns, randomly, rows, spirals, helices, corkscrews or in lattice style. The microstructures are preferably provided in a predetermined pattern. The predetermined microstructure patterns may correspond to the cavity patterns on a production mold used for forming the microstructures, thereby making it possible for the pattern formed form a particular production mold to be repeated in each grinding element. One example of a predetermined pattern has microstructures in a regular arrangement, examples being aligned rows and columns or alternating offset rows and columns. The microstructures may also be arranged in such a way that a row of microstructures is aligned directly before a second row of microstructures. As an alternative to this, one row of microstructures may be offset from the second row of microstructures.

The presence of regions on the grinding element generates a topography which varies over the surface of the grinding element. The difference in topography may be used to modify the polishing properties of a grinding article constructed therewith. In a polishing process, the mechanism which controls the movement of the substrate to be modified, relative to the grinding article, can be preprogrammed in such a way that the substrate contacts the different regions of the grinding article in accordance with a predetermined sequence, in order to achieve a desired surface modification.

The abrasive grit or abrasive produced using the particles according to the present invention preferably has a Mohs hardness in the range between 6 and 10, more preferably in the range between 7 and 10. Here, a formulation using the term "between", at this point and also in the preceding and following passages of the present invention's description, and in the claims, includes the upper and lower limiting values specified in each case.

The particles, if used as abrasive grit in grinding elements, are preferably in the form of particles having an average particle size ($d_{50}$) in the range from 1 to 250 µm, more preferably in the range from 2 to 100 µm, or 2 to 40 µm, more preferably in the range from 2 to 20 µm, and very preferably in the range from 4 to 15 µm.

Preferred particles, in the case of use as abrasive grit in accordance with the present invention, are selected from the group consisting of quartz, zirconium dioxide, aluminum oxide, zirconium dioxide, cerium dioxide, manganese oxide, silicon nitride, silicon carbide, titanium diboride, boron carbide, tungsten carbide, zirconium carbide, corundum, aluminum nitride, aluminum boron nitride, tantalum carbide, titanium carbide, garnet, boron nitride and diamond, and combinations thereof.

An especially preferred abrasive grit here is diamond.

The particles, if used as abrasive grit, may be applied to the grinding product, preferably a disk-form or wire-form grinding product or a drill head as grinding product, with layer thicknesses of a single grain. The term "layer thickness of a single grain" means that an individual layer of abrasive grit is present on the grinding product. The grains ought in any case to be selected such that a narrow particle size distribution is achieved. This ensures a more uniform cutting edge of the grinding element, preferably wire-formed grinding element, according to the present invention. The wire-formed grinding element, a saw for example, can be sharpened to a more precise, more uniform cutting edge; however, the more similar the particles are in size, the less sharpening that is required.

For precision cutting applications, suitability is possessed in particular by particulate abrasive grits, before or after coating with an average particle size ($d_{50}$) in the range from 2 to 80 µm, preferably 2 to 40 µm, and more preferably 2 to 20 µm, as measured by Fraunhofer laser diffraction with a Mastersizer 3000 from Malvern Instruments, a uniform particle size distribution being present as well, characterized in that in the case of the latter at least 50%, preferably 70%, more preferably 80%, and very preferably 90% of the grains have 85% to 115% of the average grain size.

Correspondingly, the overall cross-sectional dimension of the wire-form grinding element, a wire saw for example, for precision grinding applications on ceramic wafers ought to be between 50 and 300 µm, preferably between 100 and 250 µm, and very preferably between 120 and 200 µm.

For rough grinding, the particles of the invention as abrasive grit are employed with a relatively large particle size, e.g., up to 1000 µm, preferably between 250 and 800 µm, more preferably between 300 to 600 µm, and most preferably between 400 and 500 µm. Correspondingly, the overall cross-sectional dimension of the wire-form grinding element in accordance with the present invention, more particularly of wire saws, is from 1.0 to 8.0 mm, preferably 2.0 to 7.0 mm, and very preferably from 2.2 to 6.2 mm.

For the deposition and solid coating of the particles as abrasive grit, their surfaces having been modified with the polymer of the invention, an additional metallic phase is preferably applied on the surface of the grinding product, the particulate abrasive grit being present in dispersion in this additional metallic phase, and thus undergoing sustained bonding and anchoring on the grinding product.

The present invention, then, allows the particles of the invention to be used as abrasive grit in grinding elements, wherein a more uniform and more dense deposition of a dispersion of particulate abrasive grit in the additional metallic phase, which functions, so to speak, as the bonding phase for the abrasive grit on the grinding products, is achieved by comparison with procedures known to date. As shown in the present invention, this improved disperse incorporation of the particulate abrasive grit in the metal layer is achieved through the additional surface treatment of the abrasive grit with the polymer.

This disperse distribution of the particles of the invention as abrasive grit in grinding elements with relatively high density and relatively uniform distribution therefore permits the production of grinding elements in which abrasives (grits) are arranged and firmly anchored very favorably on the surface of the grinding product. The grinding elements available accordingly, such as sanding disks, grinding wires or drills, for example, are therefore outstandingly suitable for the corresponding applications in grinding operations in the narrower sense or else, alternatively, for the corresponding applications in cutting or drilling operations.

A further, preferred field of application for the particles of the invention is in the sector of cosmetics and of pharmaceutical formulations. Within this sector it is often necessary for organic and/or inorganic particles, particularly in cases of absent or very limited water-solubility, to be stabilized in liquid media, more particularly aqueous media. Stabilization is important for both storage and application, in order to produce uniformly and finely divided dispersions of organic and inorganic particles.

The particles and the production methods according to the present invention also offer likewise various advantages in the context of use in the sector of crop protection formulations:

Crop protection formulations are often based on particulate active ingredients which are of only very limited solubility or complete insolubility in water and therefore cannot readily be stored and delivered, preferably by spraying, in the form of aqueous solutions. Usually, therefore, crop protection formulations are formulated as dispersions or suspensions and in particular are also stored and delivered in such forms. On the other hand, in many crop protection formulations, the stability itself of the corresponding dispersions or suspensions during storage and delivery is difficult. Customarily, therefore, a series of additives are required which are intended to provide the dispersions or suspensions with additional stability during storage and delivery. Biological use of such additives, however, raises further problems and ought preferably to be avoided. Particularly in the sector of crop protection formulations, therefore, there is a desire for alternative or improved technologies with which dispersions or suspensions, particularly the concentrates thereof, can be stabilized without the presently customary auxiliaries, or at least using customary auxiliaries at reduced concentration.

The particles of the invention and their production offer greater stability to the corresponding dispersions and suspensions in the crop protection sector as well, particularly with regard to the storage of the corresponding crop protection formulations and their later delivery onto agricultural land, plants or the corresponding seed. One of the effects of the present invention is improved storage and delivery of crop protection formulations, and in particular it is possible to do without, or else at least to use only smaller amounts of, additives which have been customary to date, such as dispersants, which are added in order to improve the stability of dispersions and suspensions.

The present invention is therefore, in particular, also suitable for crop protection formulations in which particles as concentrates in the form of dispersions or suspensions, or the later diluted application solutions, "tank mixes", thereof, are stored and subsequently delivered, more particularly by spraying.

A further advantage of the particles and production methods of the invention in the area of crop protection lies in the improved adhesion of the particles on the plant, seed or agricultural land for treatment, such as fields, soil, etc., for example. The improved adhesion is a result of the reversal of polarity of the surface charge of the particles of the invention, as already described above. This improved adhesion results, for example, in improved rain resistance of crop protection formulations when the latter contain the particles according to the present invention and/or have received the particles according to the method of the invention and are subsequently used in crop protection formulations.

For the use of the particles of the invention in crop protection formulations, it is especially appropriate to employ particles of organic materials and to coat their surface with a nonampholytic, quaternizable polymer which is water-soluble at 20° C. Suitable organic materials for the particles of the invention are, in particular, pesticides (pest control agents).

A pesticide (pest control agent) is in general a chemical or biological (biopesticide) agent (such as a virus, bacterium, antimicrobial substance or disinfectant) which by virtue of its activity repels, stuns, kills or otherwise counteracts pests. The term "pests" includes, among others, insects, plant pathogens, weeds, molluscs, birds, mammals, fish, nemantodes (threadworms) and microbes, insofar they cause damage, are detrimental to agricultural production and cultivation, spread diseases or constitute vectors or transmitters of diseases.

The term "pesticide" also encompasses plant growth regulators, which modify the anticipated growth, the flowering or rate of reproduction of plants; defoliants, which bring about the dropping of leaves or foliage from the plant, usually for the purpose of easier harvesting; desiccants, which promote the drying of living tissues, especially of unwanted plant tips; plant activators, which activate plant physiology to provide defense against certain pests; safeners, which reduce the unwanted herbicidal activity of pesticides on crop plants; and plant growth promoters, which influence the plant physiology, more particularly for the purpose of increasing plant growth, biomass, yield or other quality parameters of the harvestable products of a crop plant.

Biopesticides are defined as a form of pesticides based on microorganisms (bacteria, fungi, viruses, nematodes, etc.) or on natural products (compounds such as metabolites, proteins, or extracts from biological or other natural sources) (US Environmental Protection Agency http://www.epa.gov/pestcides/biopesticides/).

Biopesticides fall into two main classes: microbial pesticides and biochemical pesticides, as follows:

(1) Microbial pesticides consist of bacteria, fungi or viruses (and often include the products of metabolism that are produced by bacteria and fungi). Nematodes are also classed as microbial pesticides, despite being multicellular.

(2) Biochemical pesticides are naturally occurring substances or are structurally similar and functionally identical to a naturally occurring substance, and/or constitute extracts from biological sources, which control pests or offer another form of plant protection as defined below; however, they have nontoxic mechanisms of action (such as the regulation of growth or development; activity as attractants, repellents or defense activators (e.g., induced resistance), for example) and are relatively low toxicity to mammals.

Biopesticides for use against plant diseases have already become established for a host of crop plants. Biopesticides, for example, are already playing an important part in the control of downy mildew. Their advantages are as follows: no barrier period before the time of harvesting, the possibility of use under moderate to severe disease pressure, and the possibility of use in a mixture or in alternating deployment with other registered pesticides.

An important growth area for biopesticides is in the region of seed treatment and of soil conditioners. Seed treatments with biopesticides are used, for example, to control fungi originating from the soil, which represent pathogens and cause seed rot, seedling blight, root rot and seedling diseases. They may also be used to control seed-borne fungal pathogens, and also fungal pathogens located on the surface of the seed. Many biopesticide-based products are also suitable for stimulating the defense mechanism of the host plant and other physiological processes that make crop plants more resistant to a host of biotic and abiotic stress factors or that are able to regulate plant growth. Many products based on biopesticides also have the capacity to raise plant health, plant growth and/or yield.

The term "plant health" is understood as a condition of the plant or its products which is determined by individual indicators or a combination thereof, such as, for example, yield (e.g., increased biomass and/or increased content of valuable ingredients), plant vigor (e.g., improved plant growth and/or greener leaves ("greening effect")), the quality (e.g., higher content or improved composition of certain ingredients), and tolerance toward abiotic and/or biotic stress. The indicators stated above for the health condition of a plant may be interdependent or may result from one another.

Pesticides which are suitable as organic particles for the purposes of the present invention encompass compounds and combinations thereof from the following classes:

A) respiratory chain inhibitors

Inhibitors of complex III at the $Q_o$ position (e. g. strobilurins): azoxystrobin, coumethoxy-strobin, coumoxystrobin, dimoxystrobin, enestroburin, fenaminstrobin, fenoxy-strobin/flufenoxystrobin, fluoxastrobin, kresoxim-methyl, mandestrobins, metominostrobin, orysastrobin, picoxystrobin, pyraclostrobin, pyrametostrobin, pyraoxystrobin, trifloxystrobin, 2-(2-(3-(2,6-dichlorophenyl)-1-methylallylideneaminooxy-methyl)phenyl)-2-methoxyimino-N-methylacetamide, pyribencarb, triclopyricarb/chlorodincarb, famoxadone, fenamidone, methyl N-[2-[(1,4-dimethyl-5-phenylpyrazol-3-yl)oxylmethyl]phenyl]-N-methoxycarbamate, 1-[3-chloro-2-[[1-(4-chlorophenyl)-1H-pyrazol-3-yl]oxymethyl]phenyl]-4-methyltetrazol-5-one, 1-[3-bromo-2-[[1-(4-chlorophenyl)pyrazol-3-yl]oxymethyl]phenyl]-4-methyltetrazol-5-one, 1-[2-[[1-(4-chlorophenyl)pyrazol-3-yl]oxymethyl]-3-methylphenyl]-4-methyltetrazol-5-one, 1-[2-[[1-(4-chlorophenyl)pyrazol-3-yl]oxymethyl]-3-fluorophenyl]-4-methyltetrazol-5-one, 1-[2-[[1-(2,4-dichlorophenyl)pyrazol-3-yl]oxymethyl]-3-fluorophenyl]-4-methyltetrazol-5-one, 1-[2-[[4-(4-chlorophenyl)thiazol-2-yl]oxymethyl]-3-methylphenyl]-4-methyltetrazol-5-one, 1-[3-chloro-2-[[4-(p-tolyl)thiazol-2-yl]oxymethyl]phenyl]-4-methyltetrazol-5-one, 1-[3-cyclopropyl-2-[[2-methyl-4-(1-methylpyrazol-3-yl)phenoxy]methyl]phenyl]-4-methyltetrazol-5-one, 1-[3-(difluoromethoxy)-2-[[2-methyl-4-(1-methylpyrazol-3-yl)phenoxy]methyl]phenyl]-4-methyltetrazol-5-one, 1-methyl-4-[3-methyl-2-[[2-methyl-4-(1-methylpyrazol-3-yl)phenoxy]methyl]phenyl]tetrazol-5-one, 1-methyl-4-[3-methyl-2-[[1-[3-(trifluoromethyl)phenyl]ethylideneamino]oxymethyl]phenyl]tetrazol-5-one, (Z,2E)-5-[1-(2,4-dichlorophenyl)pyrazol-3-yl]oxy-2-methoxyimino-N3-dimethylpent-3-enamide, (Z,2E)-5-[1-(4-chlorophenyl)pyrazol-3-yl]oxy-2-methoxyimino-N,3-dimethylpent-3-enamide, (Z,2E)-5-[1-(4-chloro-2-fluorophenyl)pyrazol-3-yl]oxy-2-methoxyimino-N,3-dimethylpent-3-enamide;

inhibitors of complex III at the Qi position: cyazofamid, amisulbrom, [(3S,6S,7R,8R)-8-benzyl-3-[(3-acetoxy-4-methoxypyridine-2-carbonyl)amino]-6-methyl-4,9-dioxo-1,5-dioxonan-7-yl] 2-methylpropanoate, [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl] 2-methylpropanoate, [(3S,6S,7R,8R)-8-benzyl-3-[(3-isobutoxycarbonyloxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(1,3-benzodioxol-5-ylmethoxy)-4-methoxypyridine-2-carbonyl]amino]-6-methyl-4,9-dioxo-1,5-dioxonan-7-yl] 2-methylpropanoate; (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl 2-methylpropanoate, (3S,6S,7R,8R)-8-benzyl-3-[3-[(isobutyryloxy)methoxy]-4-methoxypicolinamido]-6-methyl-4,9-dioxo-1,5-dioxonan-7-yl isobutyrate;

inhibitors of complex II (e.g., carboxamides): benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad, sedaxane, tecloftalam, thifluzamide, N-(4'-trifluoromethylthiobiphenyl-2-yl)-3-difluoromethyl-1-methyl-1H-pyrazole-4-carboxamide, N-(2-(1,3,3-trimethylbutyl)phenyl)-1,3-dimethyl-5-fluoro-1H-pyrazole-4-carboxamide, N-(2-(1,3,3-trimethylbutyl)phenyl)-1,3-dimethyl-5-fluoro-1H-pyrazole-4-carboxamide, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, N-(7-fluoro-1,1,3-trimethylindan-4-yl)-1,3-dimethylpyrazole-4-carboxamide, N-[2-(2,4-dichlorophenyl)-2-methoxy-1-methylethyl]-3-(difluoromethyl)-1-methylpyrazole-4-carboxamide;

other respiratory chain inhibitors (e.g., complex I, decouplers): diflumetorim, (5,8-difluoro-quinazolin-4-yl)-{2-[2-fluoro-4-(4-trifluoromethylpyridin-2-yloxy)phenyl]ethyl}amine; nitrophenyl derivates: binapacryl, dinobuton, dinocap, fluazinam; ferimzone; organometallic compounds: fentin salts, such as fentin acetates, for example, fentin chloride or fentin hydroxide; ametoctradin; and silthiofam;

B) inhibitors of sterol biosynthesis (SBI fungicides)

C14 demethylase inhibitors (DMI fungicides): triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 1-[rel-(2S; 3R)-3-(2-chlorophenyl)-2-(2,4-difluorophenyl)oxiranylmethyl]-5-thiocyanato-1H-[1,2,4]triazol, 2-[rel-(2S;3R)-3-(2-chlorophenyl)-2-(2,4-difluorophenyl)oxiranylmethyl]-2H-[1,2,4]triazole-3-thiol, 2-[2-chloro-4-(4-chlorophenoxy)phenyl]-1-(1,2,4-triazol-1-yl)pentan-2-ol, 1-[4-(4-chlorophenoxy)-2-(trifluoromethyl)phenyl]-1-cyclopropyl-2-(1,2,4-triazol-1-yl)ethanol, 2-[4-(4-chlorophenoxy)-2-(trifluoromethyl)phenyl]-1-(1,2,4-triazol-1-yl)butan-2-ol, 2-[2-chloro-4-(4-chlorophenoxy)phenyl]-1-(1,2,4-triazol-1-yl)butan-2-ol, 2-[4-(4-chlorophenoxy)-2-(trifluoromethyl)phenyl]-3-methyl-1-(1,2,4-triazol-1-yl)butan-2-ol, 2-[4-(4-chlorophenoxy)-2-(trifluoromethyl)phenyl]-1-(1,2,4-triazol-1-yl)propan-2-ol, 2-[2-chloro-4-(4-chlorophenoxy)phenyl]-3-methyl-1-(1,2,4-triazol-1-yl)butan-2-ol, 2-[4-(4-chlorophenoxy)-2-(trifluoromethyl)phenyl]-1-(1,2,4-triazol-1-yl)pentan-2-ol, 2-[4-(4-fluorophenoxy)-2-(trifluoromethyl)phenyl]-1-(1,2,4-triazol-1-yl)propan-2-ol, 2-[2-chloro-4-(4-chlorophenoxy)phenyl]-1-(1,2,4-triazol-1-yl)pent-3-yn-2-ol; imidazoles: imazalil, pefurazoate, prochloraz, triflumizole; pyrimidines, pyridines and piperazines: fenarimol, nuarimol, pyrifenox, triforin, [3-(4-chloro-2-fluorophenyl)-5-(2,4-difluorophenyl)isoxazol-4-yl]-(3-pyridyl)methanol;

Delta14 reductase I inhibitors: aldimorph, dodemorph, dodemorph acetate, fenpropimorph, tridemorph, fenpropidin, piperalin, spiroxamine;

3-ketoreductase inhibitors: fenhexamide;

C) nucleic acid synthesis inhibitors
  phenylamides or acylamino acid fungicides: benalaxyl, benalaxyl-M, kiralaxyl, metalaxyl, metalaxyl-M (mefenoxam), ofurace, oxadixyl;
  others: hymexazole, octhilinone, oxolinic acid, bupirimate, 5-fluorozytosine, 5-fluoro-2-(p-tolylmethoxy)pyrimidine-4-amine, 5-fluoro-2-(4-fluorophenylmethoxy)pyrimidin-4-amine;

D) inhibitors of cell division and of the cytoskeleton
  tubulin inhibitors, such as, for example, benzimidazoles, thiophanates: benomyl, carbendazim, fuberidazole, thiabendazole, thiophanate-methyl; triazolopyrimidines: 5-chloro-7-(4-methylpiperidin-1-yl)-6-(2,4,6-trifluorophenyl)-[1,2,4]triazolo[1,5-a]pyrimidine
  further cell division inhibitors: diethofencarb, ethaboxam, pencycuron, fluopicolid, zoxamid, metrafenon, pyriofenon;

E) inhibitors of amino acid synthesis and protein synthesis
  methionine synthesis inhibitors (anilino-pyrimidines): cyprodinil, mepanipyrim, pyrimethanil;
  protein synthesis inhibitors: blasticidin-S, kasugamycin, kasugamycin hydrochloride hydrates, mildiomycin, streptomycin, oxytetracycline, polyoxin, validamycin A;

F) signal transfer inhibitors
  MAP/histidine kinase inhibitors: fluoroimide, iprodione, procymidone, vinclozoline, fenpiclonil, fludioxonil;
  G-protein inhibitors: quinoxyfen;

G) lipid and membrane synthesis inhibitors
  phospholipid biosynthesis inhibitors: edifenphos, iprobenfos, pyrazophos, isoprothiolane;
  lipid peroxidation: dicloran, quintozene, tecnazene, tolclofos-methyl, biphenyl, chloroneb, etridiazole;
  phospholipid biosynthesis and cell wall construction: dimethomorph, flumorph, mandipropamide, pyrimorph, benthiavalicarb, iprovalicarb, valifenalate and N-(1-(1-(4-cyanophenyl)ethanesulfonyl)but-2-yl)carbamic acid 4-fluorophenyl ester;
  compounds which influence the permeability of the cell membrane and fatty acids: propamocarb, propamocarb hydrochloride
  fatty acid amide hydrolase inhibitors: oxathiapiproline, 2-{3-[2-(1-{[3,5-bis(difluoromethyl-1H-pyrazol-1-yl]acetyl}piperidin-4-yl)-1,3-thiazol-4-yl]-4,5-dihydro-1,2-oxazol-5-yl}phenylmethanesulfonate, 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate;

H) inhibitors acting at several locations
  inorganic active substances: Bordeaux mixture, copper acetate, copper hydroxide, copper oxychloride, basic copper sulfate, sulfur;
  thio- and dithiocarbamates: ferbam, mancozeb, maneb, metam, metiram, propineb, thiram, zineb, ziram;
  organochlorine compounds (e.g., phthalimides, sulfamides, chloronitriles): anilazine, chlorothalonil, captafol, captan, folpet, dichlofluanid, dichlorophen, hexachlorobenzene, pentachlorophenols and salts thereof, phthalide, tolylfluanid, N-(4-chloro-2-nitrophenyl)-N-ethyl-4-methylbenzenesulfonamide;
  guanidines and others: guanidine, dodine, dodine free base, guazatin, guazatin acetate, iminoctadine, iminoctadine triacetate, iminoctadine tris(albesilate), dithianon, 2,6-dimethyl-1H,5H-[1,4]dithiino[2,3-c:5,6-c']dipyrrole-1,3,5,7(2H,6H)-tetraone;

I) cell wall synthesis inhibitors
  inhibitors of glucan synthesis: validamycin, polyoxin B; melanine synthesis inhibitors: pyroquilone, tricyclazole, carpropamide, dicyclomet, fenoxanil;

J) plant defense inductors
  acibenzolar-S-methyl, probenazole, isotianil, tiadinil, prohexadione-calcium; phosphonates: fosetyl, fosetyl-aluminum, phosphonic acid and salts thereof;

K) unknown mechanisms of action
  bronopol, chinomethionat, cyflufenamid, cymoxanil, dazomet, debacarb, diclomezine, difenzoquat, difenzoquat methylsulfate, diphenylamine, fenpyrazamine, flumetover, flusulfamid, flutianil, methasulfocarb, nitrapyrine, nitrothal-isopropyl, oxathiapiproline, picarbutrazox, tolprocarb, 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-fluoro-6-(prop-2-yn-1-yl-oxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3- thiazol-2-yl)piperidin-1-yl]ethanone, oxine-copper, proquinazid, tebufloquin, tecloftalam, triazoxide, 2-butoxy-6-iodo-3-propylchromen-4-one, N-(cyclopropylmethoxyimino(6-difluoromethoxy-2,3-difluorophenyl)methyl)-2-phenylacetamide, N'-(4-(4-chloro-3-trifluoromethylphenoxy)-2,5-dimethylphenyl)-N-ethyl-N-methyl formamidine, N'-(4-(4-fluoro-3-trifluoromethylphenoxy)-2,5-dimethylphenyl)-N-ethyl-N-methyl formamidine, N'-(2-methyl-5-trifluoromethyl-4-(3-trimethylsilanylpropoxy)phenyl)-N-ethyl-N-methyl formamidine, N'-(5-difluoromethyl-2-methyl-4-(3-trimethylsilanylpropoxy)phenyl)-N-ethyl-N-methyl formamidine, methoxy acetic acid 6-tert-butyl-8-fluoro-2,3-dimethylquinolin-4-yl ester, 3-[5-(4-methylphenyl)-2,3-dimethylisoxazolidin-3-yl]pyridine, 3-[5-(4-chlorophenyl)-2,3-dimethylisoxazolidin-3-yl]pyridine (pyrisoxazole), N-(6-methoxypyridin-3-yl)cyclopropanecarboxamide, 5-chloro-1-(4,6-dimethoxypyrimidin-2-yl)-2-methyl-1H-benzimidazole, 2-(4-chlorophenyl)-N-[4-(3,4-dimethoxyphenyl)isoxazol-5-yl]-2-prop-2-ynyloxyacetamide, ethyl (Z)-3-amino-2-cyano-3-phenylprop-2-enoate, pentyl N-[6-[[(Z)-[(1-methyltetrazol-5-yl)-phenylmethylene]amino]oxymethyl]-2-pyridyl]carbamate, 2-[2-[(7,8-difluoro-2-methyl-3-quinolyl)oxy]-6-fluorophenyl]propan-2-ol, 2-[2-fluoro-6-[(8-fluoro-2-methyl-3-quinolypoxy]phenyl]propan-2-ol, 3-(5-fluoro-3,3,4,4-tetramethyl-3,4-dihydroisoquinolin-1-yl) quinoline, 3-(4,4-difluoro-3,3-dimethyl-3,4-dihydroisoquinolin-1-yl)quinoline, 3-(4,4,5-trifluoro-3,3-dimethyl-3,4-dihydroisoquinolin-1-yl) quinolone, 9-fluoro-2,2-dimethyl-5-(3-quinolyl)-3H-1,4-benzoxazepin;

L) biopesticides

L1) microbial pesticides with fungicidal, bactericidal, virucidal and/or plant defense-activating activity: *Ampelomyces quisqualis*, *Aspergillus flavus*, *Aureobasidium pullulans*, *Bacillus altitudinis*, *B. amyloliquefaciens*, *B. megaterium*, *B. mojavensis*, *B. mycoides*, *B. pumilus*, *B. simplex*, *B. solisalsi*, *B. subtilis*, *B. subtilis* var. *amyloliquefaciens*, *Candida oleophila*, *C. saitoana*, *Clavibacter michiganensis* (bacteriophages), *Coniothyrium minitans*, *Cryphonectria parasitica*, *Cryptococcus albidus*, *Dilophosphora alopecuri*, *Fusarium oxysporum*, *Clonostachys rosea* f. *catenulate* (also identified as *Gliocladium catenulatum*), *Gliocladium roseum*, *Lysobacter antibioticus*, *L. enzymogenes*, *Metschnikowia fructicola*, *Microdochium dimerum*, *Microsphaeropsis ochracea*, *Muscodor albus*, *Paenibacillus alvei*, *Paenibacillus polymyxa*, *P. agglomerans*, *Pantoea vagans*, *Penicillium bilaiae*, *Phlebiopsis gigantea*, *Pseudomonas* sp., *Pseudomonas chloraphis*, *P. fluorescens*, *P. putida*, *Pseudozyma flocculosa*, *Pichia anomala*, *Pythium oligandrum*, *Sphaerodes mycoparasitica*, *Streptomyces griseoviridis*, *S. lydicus*, *S. violaceusniger*, *Talaromyces flavus*, *Trichoderma asperellum*, *T. atroviride*, *T. fertile*, *T. gamsii*, *T. harmatum*, *T. harzianum*, *T. polysporum*, *T. stromaticum*, *T. virens*, *T. viride*, *Typhula phacorrhiza*, *Ulocladium oudemansii*, *Verticillium dahlia*, zucchini yellow mosaic virus (avirulent strain);

L2) biochemical pesticides with fungicidal, bactericidal, virucidal and/or plant defense-activating activity: chitosan (hydrolysate), harpin protein, laminarin, menhaden fish oil, natamycin, sharka virus coat protein, potassium or sodium bicarbonate, *Reynoutria sachalinensis* extract, salicylic acid, tea tree oil;

L3) microbial pesticides with insecticidal, acaricidal, molluscicidal and/or nematicidal activity: *Agrobacterium radiobacter*, *Bacillus cereus*, *B. firmus*, *B. thuringiensis*, *B. thuringiensis* ssp. *aizawai*, *B. t.* ssp. *israelensis*, *B. t.* ssp. *galleriae*, *B. t.* ssp. *kurstaki*, *B. t.* ssp. *tenebrionis*, *Beauveria bassiana*, *B. brongniartii*, *Burkholderia* spp., *Chromobacterium subtsugae*, *Cydia pomonella* granulovirus (CpGV), *Cryptophlebia leucotreta* granulovirus (CrleGV), *Flavobacterium* spp., *Helicoverpa armigera* nucleopolyhedrovirus (HearNPV), *Heterorhabditis bacteriophora*, *Isaria fumosorosea*, *Lecanicillium longisporum*, *L. muscarium*, *Metarhizium anisopliae*, *Metarhizium anisopliae* var. *anisopliae*, *M anisopliae* var. *acridum*, *Nomuraea rileyi*, *Paecilomyces lilacinus*, *Paenibacillus popilliae*, *Pasteuria* spp., *P. nishizawae*, *P. penetrans*, *P. ramosa*, *P. thornea*, *P. usgae*, *Pseudomonas fluorescens*, *Spodoptera littoralis* nucleopolyhedrovirus (SpliNPV), *Steinernema carpocapsae*, *S. feltiae*, *S. kraussei*, *Streptomyces galbus*, *S. microflavus*, L4) biochemical pesticides with insecticidal, acaricidal, molluscicidal, pheromone-like and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, cis-jasmone, 2-methyl-1-butanol, methyleugenol, methyl jasmonate, (E,Z)-2,13-octadecadien-1-ol, (E,Z)-2,13-octadecadien-1-ol acetate, (E,Z)-3,13-octadecadien-1-ol, R-1-octen-3-ol, pentatermanone, potassium silicate, sorbitol octanoate, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, acacia negra extract, extract from grapefruit seed and grapefruit flesh, extract from *Chenopodium ambrosiodes*, cat mint oil, neem oil, soap tree extract, tagetes oil;

L5) microbial pesticides with plant stress-reducing, plant growth-promoting and/or yield-increasing activity: *Azospirillum amazonense*, *A. brasilense*, *A. lipoferum*, *A. irakense*, *A. halopraeferens*, *Bradyrhizobium* spp., *B. elkanii*, *B. japonicum*, *B. liaoningense*, *B. lupini*, *Delftia acidovorans*, *Glomus intraradices*, *Mesorhizobium* spp., *Rhizobium leguminosarum* bv. *phaseoli*, *R. l.* bv. *trifolii*, *R. l.* bv. *viciae*, *R. tropici*, *Sinorhizobium meliloti*, L6) biochemical pesticides with plant stress-reducing, plant growth-regulating and/or plant yield-increasing activity: abscissic acid, aluminum silicates (kaolin), 3-decen-2-one, formononetin, genistein, hesperetin, homobrassinolide, humate, jasmonic acid and its derived salts and derivatives, lysophosphatidylethanolamine, naringenin, polymeric polyhydroxy acid, *Ascophyllum nodosum* (Norwegian kelp, Brown kelp, knotted wrack) extract and *Ecklonia maxima* (kelp) extract;

M) growth regulators abscissic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfid, indole- 3-acetic acid, maleic hydrazide, mefluidid, mepiquat (mepiquat chloride), naphthaleneacetic acid, N-6-benzyladenine, paclobutrazole, prohexadione (prohexadione-calcium), prohydrojasmon, thidiazuron, triapenthenol, tributyl phosphorotrithioate, 2,3,5-triiodobenzoic acid, trinexapac-ethyl and uniconazole;

N) herbicides acetamides: acetochlor, alachlor, butachlor, dimethachlor, dimethenamid, flufenacet, mefenacet, metolachlor, metazachlor, napropamid, naproanilid, pethoxamid, pretilachlor, propachlor, thenylchlor;

amino acid derivatives: bilanafos, glyphosate, glufosinate, sulfosate;

aryloxyphenoxypropionates: clodinafop, cyhalofop-butyl, fenoxaprop, fluazifop, haloxyfop, metamifop, propaquizafop, quizalofop, quizalofop-p-tefuryl;

bipyridyls: diquat, paraquat;

(thio)carbamates: asulam, butylate, carbetamide, desmedipham, dimepiperate, eptam (EPTC), esprocarb, molinate, orbencarb, phenmedipham, prosulfocarb, pyributicarb, thiobencarb, triallate;

cyclohexanediones: butroxydim, clethodim, cycloxydim, profoxydim, sethoxydim, tepraloxydim, tralkoxydim;

dinitroanilines: benfluralin, ethalfluralin, oryzalin, pendimethalin, prodiamine, trifluralin;

diphenyl ethers: acifluorfen, aclonifen, bifenox, diclofop, ethoxyfen, fomesafen, lactofen, oxyfluorfen;

hydroxybenzonitriles: bromoxynil, dichlobenil, ioxynil;

imidazolinones: imazamethabenz, imazamox, imazapic, imazapyr, imazaquin, imazethapyr;

phenoxyacetic acids: clomeprop, 2,4-dichlorophenoxyacetic acid (2,4-D), 2,4-DB, dichlorprop, MCPA, MCPA-thioethyl, MCPB, mecoprop;

pyrazines: chloridazone, flufenpyr-ethyl, fluthiacet, norflurazone, pyridate;

pyridines: aminopyralid, clopyralid, diflufenican, dithiopyr, fluridon, fluroxypyr, picloram, picolinafen, thiazopyr;

sulfonylureas: amidosulfuron, azimsulfuron, bensulfuron, chlorimuron-ethyl, chlorsulfuron, cinosulfuron, cyclosulfamuron, ethoxysulfuron, flazasulfuron, flucetosulfuron, flupyrsulfuron, foramsulfuron, halosulfuron, imazosulfuron, iodosulfuron, mesosulfuron, metazosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron, 1-((2-chloro-6-propylimidazo[1,2-b]pyridazin-3-yl)sulfonyl)-3-(4,6-dimethoxypyrimidin-2-yl)urea;

triazines: ametryn, atrazine, cyanazine, dimethametryn, ethiozine, hexazinone, metamitron, metribuzin, prometryn, simazine, terbuthylazine, terbutryn, triaziflam, trifludimoxazine;

ureas: chlorotoluron, daimuron, diuron, fluometuron, isoproturon, linuron, metha-benzthiazuron, tebuthiuron;

further acetolactate synthase inhibitors: bispyribac-sodium, cloransulam-methyl, diclosulam, florasulam, flucarbazone, flumetsulam, metosulam, ortho-sulfamuron, penoxsulam, propoxycarbazone, pyribambenz-propyl, pyribenzoxim, pyriftalid, pyriminobac-methyl, pyrimisulfan, pyrithiobac, pyroxasulfone, pyroxsulam;

others: amicarbazone, aminotriazole, anilofos, beflubutamid, benazoline, bencarbazone, benfluresate, benzofenap, bentazone, benzobicyclon, bicyclopyron, bromacil, bromobutide, butafenacil, butamifos, cafenstrol, carfentrazone, cinidon-ethyl, chlorthal, cinmethyline, clomazone, cumyluron, cyprosulfamid, dicamba, difenzoquat, diflufenzopyr, *Drechslera monoceras*, endothal, ethofumesate, etobenzanid, fenoxasulfon, fentrazamid, flumiclorac-pentyl, flumioxazine, flupoxam, flurochloridone, flurtamon, indanofan, isoxaben, isoxaflutol, lenacil, propanil, propyzamide, quinclorac, quinmerac, mesotrione, methylarsenic acid, naptalam, oxadiargyl, oxadiazon, oxaziclomefon, pentoxazone, pinoxaden, pyraclonil, pyraflufen-ethyl, pyrasulfotol, pyrazoxyfen, pyrazolynat, quinoclamine, saflufenacil, sulcotrione, sulfentrazone, terbacil, tefuryltrione, tembotrione, thiencarbazone, topramezone, (3-[2-chloro-4-fluoro-5-(3-methyl-2,6-dioxo-4-trifluoromethyl-3,6-dihydro-2H-pyrimidin-1-yl)phenoxy]pyridin-2-yloxy)acetic acid ethyl ester, 6-amino-5-chloro-2-cyclopropylpyrimidine-4-carboxylic acid methyl ester, 6-chloro-3-(2-cyclopropyl-6-methylphenoxy)pyridazin-4-ol, 4-amino-3-chloro-6-(4-chlorophenyl)-5-fluoropyridine-2-carboxylic acid, 4-amino-3-chloro-6-(4-chloro-2-fluoro-3-methoxyphenyl)pyridine-2-carboxylic acid methyl ester, and 4-amino-3-chloro-6-(4-chloro-3-dimethylamino-2-fluorophenyl)pyridine-2-carboxylic acid methyl ester.

O) insecticides organo(thio)phosphates: acephate, azamethiphos, azinphos-methyl, chlorpyrifos, chlorpyrifos-methyl, chlorfenvinphos, diazinon, dichlorvos, dicrotophos, dimethoate, disulfotone, ethion, fenitrothion, fenthion, isoxathion, malathion, methamidophos, methidathion, methyl-parathion, mevinphos, monocrotophos, oxydemeton-methyl, paraoxone, parathion, phenthoate, phosalone, phosmet, phosphamidone, phorate, phoxim, pirimiphos-methyl, profenofos, prothiofos, sulprophos, tetrachlorvinphos, terbufos, triazophos, trichlorfon;

carbamates: alanycarb, aldicarb, bendiocarb, benfuracarb, carbaryl, carbofuran, carbosulfan, fenoxycarb, furathiocarb, methiocarb, methomyl, oxamyl, pirimicarb, propoxur, thiodicarb, triazamate;

pyrethroids: allethrin, bifenthrin, cyfluthrin, cyhalothrin, cyphenothrin, cypermethrin, alpha-cypermethrin, beta-cypermethrin, zeta-cypermethrin, deltamethrin, esfenvalerate, etofenprox, fenpropathrin, fenvalerate, imiprothrin, lambda-cyhalothrin, permethrin, prallethrin, pyrethrin I and II, resmethrin, silafluofen, tau-fluvalinate, tefluthrin, tetramethrin, tralomethrin, transfluthrin, profluthrin, dimefluthrin;

insect growth regulators: a) chitin synthesis inhibitors: benzoylureas: chlorfluazuron, cyramazine, diflubenzuron, flucycloxuron, flufenoxuron, hexaflumuron, lufenuron, novaluron, teflubenzuron, triflumuron; buprofezine, diofenolane, hexythiazox, etoxazole, clofentazine; b) ecdysone antagonists: halofenozide, methoxyfenozide, tebufenozide, azadirachtin; c) juvenoids: pyriproxyfen, methopren, fenoxycarb; d) lipid biosynthesis inhibitors: spirodiclofen, spiromesifen, spirotetramat;

nicotine receptor agonist/antagonist compounds: clothianidin, dinotefuran, flupyradifuron, imidacloprid, thiamethoxam, nitenpyram, acetamiprid, thiacloprid, 1-(2-chlorothiazol-5-ylmethyl)-2-nitrimino-3,5-dimethyl-[1,3,5]triazinane;

GABA antagonist compounds: endosulfan, ethiprole, fipronil, vaniliprole, pyrafluprole, pyriprole, 5-amino-1-(2,6-dichloro-4-methylphenyl)-4-sulfinamoyl-1H-pyrazole-3-carbothionamide;

macrocyclic lactone insecticides: abamectin, amamectin, milbemectin, lepimectin, spinosad, spinetoram;

mitochondrial electron transport inhibitors: (METI) I acaricides: fenazaquin, pyridaben, tebufenpyrad, tolfenpyrad, flufenerim;

METI II and III compounds: acequinocyl, fluacyprim, hydramethylnon;

decouplers: chlorfenapyr;

oxidative phosphorylation inhibitors: cyhexatin, diafenthiuron, fenbutatin oxide, propargite;

active molting disruptor ingredients: cryomazine;

oxidase inhibitors with mixed effect: piperonyl butoxide;

sodium channel blockers: indoxacarb, metaflumizone;

ryanodine receptor inhibitors: chlorantraniliprole, cyantraniliprole, flubendiamide, N-[4,6-dichloro-2-[(diethyllambda-4-sulfanylidene)carbamoyl]phenyl]-2-(3-chloro-2-pyridyl)-5-(trifluoromethyl)pyrazole-3-carboxamide; N-[4-chloro-2-[(diethyllambda-4-sulfanylidene)carbamoyl]-6-methylphenyl]-2-(3-chloro-2-pyridyl)-5-(triflu-oromethyl)pyrazole-3-carboxamide; N-[4-chloro-2-[(di-2-propyllambda-4-sulfanylidene)carbamoyl]-6-methylphenyl]-2-(3-chloro-2-pyridyl)-5-(trifluoromethyl)pyrazole-3-carboxamide; N-[4,6-dichloro-2-[(di-2-propyllambda-4-sulfanylidene)carbamoyl]phenyl]-2-(3-chloro-2-pyridyl)-5-(trifluoromethyl)pyrazole-3-carboxamide; N-[4,6-dichloro-2-[(diethyllambda-4-sulfanylidene)carbamoyl]phenyl]-2-(3-chloro-2-pyridyl)-5-(difluoromethyl)pyrazole-3-carboxamide; N-[4,6-dibromo-2-[(di-2-propyllambda-4-sulfanylidene)carbamoyl]phenyl]-2-(3-chloro-2-pyridyl)-5-(trifluoromethyl)pyrazole-3-carboxamide; N-[4-chloro-2-[(di-2-propyllambda-4-sulfanylidene)carbamoyl]-6-cyanophenyl]-2-(3-chloro-2-pyridyl)-5-(trifluoromethyl)pyrazole-3-carboxamide; N-[4,6-dibromo-2-[(diethyllambda-4-sulfanylidene)carbamoyl]phenyl]-2-(3-chloro-2-pyridyl)-5-(tri-fluoromethyl)pyrazole-3-carboxamide;

others: benclothiaz, bifenazate, cartap, flonicamid, pyridalyl, pymetrozine, sulfur, thiocyclam, cyenopyrafen, flupyrazofos, cyflumetofen, amidoflumet, imicyafos, bistrifluron, pyrifluquinazone and 1,1'-[(3S,4R,4aR,6S,6aS,12R,12aS,12bS)-4-[[(2-cyclopropylacetyl)oxy]methyl]-1,3,4,4a,5,6,6a,12,12a,12b-decahydro-12-hydroxy-4,6a,12b-trimethyl-11-oxo-9-(3-pyridinyl)-2H,11H-naphtho[2,1-b]pyrano[3,4-e]pyran-3,6-diyl]cyclopropaneacetic acid ester.

The pesticides selected from groups L1), L3) and L5), in terms of the mixtures, include not only the isolated, pure cultures of the respective microorganisms as defined above, but also the cell-free extracts with pesticidal activity, preferably a ketone-based extract, the suspensions thereof in a total culture broth or as metabolite-bearing supernatant, or a purified metabolite obtained from a total culture broth of a microorganism or microorganism strain.

"Total culture both" refers to a liquid culture which has not only cells but also medium.

"Supernatant" or "culture medium" refers to the liquid liquor obtained when the cells cultivated in the broth are removed by centrifugation, filtration, sedimentation or in another known way.

The term "metabolite" refers to any compound, substance or byproduct (including but not limited to secondary metabolites of lower compounds, polyketides, fatty acid synthesis products, nonribosomal peptides, proteins, and enzymes) produced by a microorganism (such as fungi or bacteria) which exhibits pesticidal activity or which improves plant growth, plant water utilization efficiency, plant health, plant habit, or population with advantageous microorganisms in the soil in the vicinity of the plant.

The term "mutant" refers to a microorganism which has been obtained by direct mutant selection, but also includes microorganisms which have been additionally mutated or otherwise modified (through the introduction, for example, of a plasmid). Accordingly, the embodiments encompass mutants, variants and/or derivatives of the corresponding microorganisms, i.e., both naturally occurring and artificially produced mutants. Mutants can be produced, for example, by treating microorganisms with known mutagens, examples being N-methyl-nitroguanidines, by customary methods. These mutants preferably retain the pesticidal activity of the corresponding microorganisms.

The pesticides on a chemical basis are described by their common names; their preparation and biological activity, against harmful fungi, pests or weeds, for example, are known (cf.: http://www.alanwood.net/pesticides/); these substances are commercially available and known, for example, through the following references:

benalaxyl, methyl N-(phenylacetyl)-N-(2,6-xylyl)-DL-alaninate (DE 29 03 612); metalaxyl, methyl N-(methoxyacetyl)-N-(2,6-xylyl)-DL-alaninate (GB 15 00 581); ofurace, (RS)-α-(2-chloro-N-2,6-xylylacetamido)-γ-butyrolactone [CAS 58810-48-3]; oxadixyl; N-(2,6-dimethylphenyl)-2-methoxy-N-(2-oxo-3-oxazolidinyl) acetamide (GB 20 58 059); aldimorph, "4-alkyl-2,5(or 2,6)-dimethylmorpholine", comprising 65-75% of 2,6-dimethylmorpholine and 25-35% of 2,5-dimethylmorpholine, comprising more than 85% of 4-dodecyl-2,5(or 2,6)-dimethylmorpholine, where "alkyl" also includes octyl, decyl, tetradecyl and hexadecyl, with a cis/trans ratio of 1:1 [91315-15-0]; dodine, 1-dodecylguanidinium acetate (Plant Dis. Rep., vol. 41, p. 1029 (1957)); dodemorph, 4-cyclodo-decyl-2,6-dimethylmorpholine (DE 1198125); fenpropimorph, (RS)-cis-4-[3-(4-tert-butylphenyl)-2-methylpropyl]-2,6-dimethylmorpholine (DE 27 52 096); fenpropidine, (RS)-1-[3-(4-tert-butyl-phenyl)-2-methylpropyl]piperidine (DE 27 52 096); guazatine, mixture of the reaction products from the amidation of technical-grade iminodi(octamethylene)diamine, comprising various guanidines and polyamines [108173-90-6]; iminoctadine, 1,1'-iminodi(octamethylene)diguanidine (Congr. Plant Pathol. 1, p. 27 (1968); spiroxamine, (8-tert-butyl-1,4-dioxaspiro[4.5] dec-2-yl)-diethylamine (EP-A 281 842); tridemorph, 2,6-dimethyl-4-tridecylmorpholine (DE 11 64 152); pyrimethanil, 4,6-dimethylpyrimidin-2-ylphenylamine (DD-A 151 404); mepanipyrim, (4-methyl-6-prop-1-ynylpyrimidin-2-yl)phenylamine (EP-A 224 339); cyprodinil, (4-cyclopropyl-6-methylpyrimidin-2-yl)phenylamine (EP-A 310 550); cycloheximide, 4-{(2R)-2-[(1 S,3S,5S)-3,5-dimethyl-2-oxocyclohexyl]-2-hydroxyethyl}piperidine-2,6-dione [CAS RN 66-81-9]; griseofulvin, 7-chloro-2',4,6-trimethoxy-6'-methylspiro[benzofuran-2(3H), 1'-cyclohex-2'-ene]-3,4'-dione [126-07-8]; kasugamycine, 3-O-[2-amino-4-[(carboxyiminomethyl)amino]-2,3,4,6-tetradeoxy-α-D- arabinohexopyranosyl]-D-chiro-inositol [6980-18-3]; natamycine, (8E,14E,16E,18E,20E)-(1R,3S,5R,7R,12R, 22R,24S,25R,26S)-22-(3-amino-3,6-dideoxy-1-β-mannopyranosyloxy)-1,3,26-trihydroxy-12-methyl-10-oxo-6,11, 28-trioxatricyclo[22.3.1.05,7]octacosa-8,14,16,18,20-pentaene-25-carboxylic acid [7681-93-8]; polyoxin, 5-(2-amino-5-O-carbamoyl-2-deoxy-L-xylon-amido)-1-(5-carboxy-1,2,3,4-tetrahydro-2,4-dioxopyrimidin-1-yl)-1,5-dideoxy-β-D-allofuranuronic acid [22976-86-9]; streptomycin, 1,1'-{1-L-(1,3,5/2,4,6)-4-[5-deoxy-2-O-(2-deoxy-2-methylamino-α-L-glucopyranosyl)-3-C-formyl-α-L-lyxofuranosyloxy]-2,5,6-trihydroxycyclohex-1,3-ylene}diguanidine (J. Am. Chem. Soc. 69, p. 1234 (1947)); bitertanol, β-([1,1'-biphenyl]-4-yloxy)-α-(1,1-dimethylethyl)-1H-1,2,4-triazole-1-ethanol (DE 23 24 020); bromuconazole, 1-[[4-bromo-2-(2,4-dichlorophenyl)tetrahydro-2-furanyl]methyl]-1H-1,2,4-triazole (Proc. Br. Crop. Prot. Conf. 1990—Pests Dis. Vol. 1, p. 459); cyproconazole, 2-(4-chlorophenyl)-3-cyclopropyl-1-[1,2,4]triazol-1-ylbutan-2-ol (U.S. Pat. No. 4,664,696); difenoconazole, 1-{2-[2-chloro-4-(4-chlorophenoxy)phenyl]-4-methyl-[1,3]dioxolan-2-ylmethyl}-1H-[1,2,4]triazole (GB-A 2 098 607); diniconazole, (βE)-β-[(2,4-dichlorophenyl)methylene]-α-(1,1-dimethylethyl)-1H-1,2,4-triazole-1-ethanol (Noyaku Kagaku, 1983, Vol. 8, p. 575); enilconazole (imazalil), 1-[2-(2,4-dichlorophenyl)-2-(2-propenyloxy)ethyl]-1H-imidazole (Fruits 28, p. 545, 1973); epoxiconazole, (2RS,3SR)-1-[3-(2-chlorophenyl)-2,3-epoxy-2-(4-fluorophenyl)propyl]-1H-1,2,4-triazole (EP-A 196 038); fenbuconazole, α-[2-(4-chlorophenyl)ethyl]-α-phenyl-1H-1,2,4-triazole-1-propanenitrile (Proc. Br. Crop Prot. Conf. 1988—Pests Dis. vol. 1, p. 33); fluquinconazole, 3-(2,4-dichlorophenyl)-6-fluoro-2-[1,2,4]-triazol-1-yl-3H-quinazolin-4-one (Proc. Br. Crop Prot. Conf.-Pests Dis., 5-3, 411 (1992)); flusilazole, 1-{[bis(4-fluorophenyl)methylsilanyl]methyl}-1H-[1,2,4] triazole (Proc. Br. Crop Prot. Conf.-Pests Dis., 1, 413 (1984)); flutriafol, α-(2-fluorophenyl)-α-(4-fluorophenyl)-1H-1,2,4-triazole-1-ethanol (EP 15 756); hexaconazole, 2-(2,4-dichlorophenyl)-1-[1,2,4]triazol-1-ylhexan-2-ol [79983-71-4]; ipconazole, 2-[(4-chlorophenyl)methyl]-5-(1-methylethyl)-1-(1H-1,2,4-triazol-1-ylmethyl)cyclopentanol (EP 267 778), metconazole, 5-(4-chlorobenzyl)-2,2-dimethyl-1-[1,2,4]triazol-1-ylmethylcyclopentanol (GB 857 383); myclobutanil, 2-(4-chlorophenyl)-2-[1,2,4]triazol-1-ylmethylpentanenitrile [88671-89-0]; penconazole, 1-[2-(2, 4-dichlorophenyl)-pentyl]-1H-[1,2,4]triazole (Pesticide Manual, 12th ed. (2000), p. 712); propiconazole, 1-[[2-(2, 4-dichlorophenyl)-4-propyl-1,3-dioxolan-2-yl]methyl]-1H-1,2,4-triazole (BE 835 579); prochloraz, N-(propyl-[2-(2,4, 6-trichlorophenoxy)ethyl])imidazole-1-carboxamide (U.S. Pat. No. 3,991,071); prothioconazole, 2-[2-(1-chlorocyclopropyl)-3-(2-chlorophenyl)-2-hydroxypropyl]-2,4-dihydro-[1,2,4]triazole-3-thione (WO 96/16048); simeconazole, α-(4-fluorophenyl)-α-[(trimethylsilyl)methyl]-1H-1,2,4-triazole-1-ethanol [CAS RN 149508-90-7]; tebuconazole, 1-(4-chlorophenyl)-4,4-dimethyl-3-[1,2,4]triazol-1-ylmethylpentan-3-ol (EP-A 40 345); tetraconazole, 1-[2-(2,4-dichlorophenyl)-3-(1,1,2,2-tetrafluoroethoxy)propyl]-1H-1,2, 4-triazole (EP 234 242); triadimefon, 1-(4-chlorophenoxy)-3,3-dimethyl-1-(1H-1,2,4-triazol-1-yl)-2-butanone (BE 793 867); triadimenol, β-(4-chlorophenoxy)-α-(1,1-dimethylethyl)-1H-1,2,4-triazole-1-ethanol (DE 23 24 010); triflumizole, (4-chloro-2-trifluoromethylphenyl)-(2-propoxy-1-[1,2,4]triazol-1-yl-ethylidene)amine (JP-A 79/119 462); triticonazole, (5E)-5-[(4-chlorophenyl)methylene]-2,2-dimethyl-1-(1H-1,2,4-triazol-1-ylmethyl)cyclopentanol (FR 26 41 277); iprodione, N-isopropyl-3-(3,5-dichlorophenyl)-2, 4-dioxoimidazolidine-1-carboxamide (GB 13 12 536); myclozoline, (RS)-3-(3,5-dichlorophenyl)-5-methoxymethyl-5-methyl-1,3-oxazolidine-2,4-dione [54864-61-8]; procymidon, N-(3,5-dichlorophenyl)-1,2-dimethylcyclopropane-1,2-dicarboximide (U.S. Pat. No. 3,903,090); vinclozoline, 3-(3,5-dichlorophenyl)-5-methyl-5-vinyloxazolidine-2,4-dione (DE A 22 07 576); ferbam, iron(3+) dimethyldithiocarbamate (U.S. Pat. No. 1,972,961); nabam, disodium ethylenebis(dithiocarbamate) (U.S. Pat. No. 2,317, 765); maneb, manganese ethylenebis(dithiocarbamate) (U.S. Pat. No. 2,504,404); mancozeb, manganese ethylenebis(dithiocarbamate) polymer complex zinc salt (GB 996 264); metam, methyldithiocarbaminic acid (U.S. Pat. No. 2,791,605); metiram, zinc ammoniate ethylenebis(dithiocarbamate) (U.S. Pat. No. 3,248,400); propineb, zinc propylenebis(dithiocarbamate) polymer (BE 611 960); polycarbamate, bis(dimethylcarbamodithioato-S,S')[μ-[[1,2-ethanediylbis[carbamodithioato-S,S']](2-)]]di[zinc] [64440-88-6]; thiram, bis(dimethyl-thiocarbamoyl) disulfide (DE 642 532); ziram, dimethyldithiocarbamate [137-30-4]; zineb, zinc ethylenebis(dithiocarbamate) (U.S. Pat. No. 2,457,674); anilazine, 4,6-dichloro-N-(2-chlorophenyl)-1,3, 5-triazine-2-amine (U.S. Pat. No. 2,720,480); benomyl, N-butyl-2-acetylaminobenzoimidazole-1-carboxamide (U.S. Pat. No. 3,631,176); boscalid, 2-chloro-N-(4'-chlorobiphenyl-2-yl)nicotinamide (EP-A 545 099); carbendazim, methyl (1H-benzoimidazol-2-yl)carbamate (U.S. Pat. No. 3,657,443); carboxin, 5,6-dihydro-2-methyl-N-phenyl-1,4-oxathiine-3-carboxamide (U.S. Pat. No. 3,249,499); oxycarboxin, 5,6-dihydro-2-methyl-1,4-oxathiine-3-carboxanilide 4,4-dioxide (U.S. Pat. No. 3,399,214); cyazofamid, 4-chloro-2-cyano-N,N-dimethyl-5-(4-methylphenyl)-1H-imidazole-1-sulfonamide [120116-88-3]; dazomet, 3,5-dimethyl-1,3,5-thiadiazinane-2-thione (Bull. Soc. Chim. Fr. 15, p. 891 (1897)); dithianone, 5,10-dioxo-5,10-dihydronaphtho [2,3-b][1,4]dithiine-2,3-dicarbonitrile (GB 857 383); famoxadon, (RS)-3-anilino-5-methyl-5-(4-phenoxyphenyl)-1,3-oxazolidine-2,4-dione [131807-57-3]; fenamidon, (S)-1-anilino-4-methyl-2-methylthio-4-phenylimidazolin-5-one [161326-34-7]; fenarimol, α-(2-chlorophenyl)-α-(4-chlorophenyl)-5-pyrimidinemethanol (GB 12 18 623); fuberidazole, 2-(2-furanyl)-1H-benzimidazole (DE 12 09 799); flutolanil, α,α,α-trifluoro-3'-isopropoxy-o-toluanilid (JP 1104514); furametpyr, 5-chloro-N-(1,3-dihydro-1,1,3-trimethyl-4-isobenzofuranyl)-1,3-dimethyl-1H-pyrazole-4-carboxamide [123572-88-3]; isoprothiolane, diisopropyl 1,3-dithiolan-2-ylidenemalonate (Proc. Insectic. Fungic. Conf. 8. Vol. 2, p. 715 (1975)); mepronil, 3'-isopropoxy-o-toluanilid (U.S. Pat. No. 3,937,840); nuarimol, α-(2-chlorophenyl)-α-(4-fluorophenyl)-5-pyrimidinemethanol (GB 12 18 623); fluopicolid (picobenzamide), 2,6-dichloro-N-(3-chloro-5-trifluoromethylpyridin-2-ylmethyl)benzamide (WO 99/42447); probenazole, 3-allyloxy-1,2-benzothiazole 1,1-dioxide (Agric. Biol. Chem. 37, p. 737 (1973)); proquinazid, 6-iodo-2-propoxy-3-propylquinazolin-4(3H)-one (WO 97/48684); pyrifenox, 2',4'-dichloro-2-(3-pyridyl)acetophenone (EZ)—O-methyloxime (EP 49 854); pyroquilon, 1,2,5,6-tetra-hydropyrrolo[3,2,1-ij]quinolin-4-one (GB 139 43 373) quinoxyfen, 5,7-dichloro-4-(4-fluorophenoxy)quinoline (U.S. Pat. No. 5,240,940); silthiofam, N-allyl-4,5-dimethyl-2-(trimethylsilyl)thiophene-3-carboxamide [CAS RN 175217-20-6]; thiabendazole, 2-(1,3-thiazol-4-yl)benzimidazole (U.S. Pat. No. 3,017,415); thifluzamid, 2',6'-dibromo-2-methyl-4'-trifluoromethoxy-4-trifluoromethyl-1,3-thi-azole-5-carboxanilide [130000-40-7]; thiophanate-methyl, 1,2-phenylenebis(iminocarbonothioyl) bis (dimethylcarbamate) (DE-A 19 30 540); tiadinil, 3'-chloro- 4,4'-dimethyl-1,2,3-thiadiazole-5-carboxanilide [223580-51-6]; tricyclazole, 5-methyl-1,2,4-triazolo[3,4-b][1,3]benzothiazole [CAS RN 41814-78-2]; triforin, N,N'-{piperazine-1,4-diylbis[(trichloromethyl)methylene]}diformamide (DE 19 01 421); Bordeaux mixture, mixture of $CuSO_4 \times 3Cu(OH)_2 \times 3CaSO_4$ [8011-63-0]; copper acetate, $Cu(OCOCH_3)_2$[8011-63-0]; copper oxychloride, $Cu_2Cl(OH)_3$ [1332-40-7]; basic copper sulfate, $CuSO_4$ [1344-73-6]; binapacryl, (RS)-2-sec-butyl-4,6-dinitrophenyl 3-methylcrotonate [485-31-4]; dinocap, mixture of 2,6-dinitro-4-octylphenyl crotonate and 2,4-dinitro-6-octylphenyl crotonate, where "octyl" represents a mixture of 1-methylheptyl, 1-ethylhexyl and 1-propylpentyl (U.S. Pat. No. 2,526,660); dinobuton, (RS)-2-sec-butyl-4,6-dinitrophenyl isopropyl carbonate [973-21-7]; nitrothal-isopropyl, diisopropyl 5-nitroisophthalate (Proc. Br. Insectic. Fungic. Conf. 7., vol. 2, p. 673 (1973)); fenpiclonil, 4-(2,3-dichlorophenyl)-1H-pyrrol-3-carbonitrile (Proc. 1988 Br. Crop Prot. Conf.—Pests Dis., vol. 1, p. 65); fludioxonil, 4-(2,2-difluorobenzo[1,3]dioxol-4-yl)-1H-pyrrol-3-carbonitrile (The Pesticide Manual, publ. The British Crop Protection Council, 10th ed. (1995), p. 482); acibenzolar-S-methyl, methyl 1,2,3-benzo-thiadiazole-7-carbothioate [135158-54-2]; flubenthiavalicarb (benthiavalicarb), isopropyl {(S)-1-[(1R)-1-(6-fluorobenzothiazol-2-yl)-ethylcarbamoyl]-2-methylpropyl}carbamate (JP-A 09/323 984); carpropamid, 2,2-dichloro-N-[1-(4-chlorophenyl)ethyl]-1-ethyl-3-methylcyclopropane-carboxamide [CAS RN 104030-54-8]; chlorothalonil, 2,4,5,6-tetrachloroisophthalonitrile (U.S. Pat. No. 3,290,353); cyflufenamid, (Z)—N-[α-(cyclopropylmethoxyimino)-2,3-difluoro-6-(trifluoro-methyl)benzyl]-2-phenylacetamide (WO 96/19442); cymoxanil, 1-(2-cyano-2-methoxyimino-acetyl)-3-ethylurea (U.S. Pat. No. 3,957,847); diclomezin, 6-(3,5-dichlorophenyl-p-tolyl)pyridazin-3(2H)-one (U.S. Pat. No. 4,052,395) diclocymet, (RS)-2-cyano-N—[(R)-1-(2,4-dichlorophenyl)ethyl]-3,3-dimethylbutyramide [139920-32-4]; diethofencarb, isopropyl 3,4-diethoxycarbanilate (EP 78 663); edifenphos, O-ethyl S,S-diphenyl phosphorodithioate (DE 14 93 736) ethaboxam, N-(cyano-2-thienylmethyl)-4-ethyl-2-(ethylamino)-5-thiazolecarboxamide (EP-A 639 574); fenhexamid, N-(2,3-dichloro-4-hydroxyphenyl)-1-methylcyclohexanecarboxamide (Proc. Br. Crop Prot. Conf.—Pests Dis., 1998, vol. 2, p. 327); fentin acetate, triphenyltin (U.S. Pat. No. 3,499,086); fenoxanil, N-(1-cyano-1,2-dimethylpropyl)-2-(2,4-dichlorophenoxy)propanamide (EP 262 393); ferimzone, mepanipyrim, (Z)-2'-methylacetophenone-4,6-dimethylpyrimidin-2-ylhydrazone [89269-64-7]; fluazinam, 3-chloro-N-[3-chloro-2,6-dinitro-4-(trifluoromethyl)phenyl]-5-(trifluoro-methyl)-2-pyridineamine (The Pesticide Manual, publ. The British Crop Protection Council, 10th ed. (1995), p. 474); fosetyl, fosetyl-aluminum, ethyl phosphonate (FR 22 54 276); iprovalicarb, isopropyl [(1 S)-2-methyl-1-(1-p-tolylethylcarbamoyl)propyl]carbamate (EP-A 472 996); hexachlorobenzene (C. R. Seances Acad. Agric. Fr. 31, p. 24, 1945); metrafenon, 3'-bromo-2,3,4,6'-tetramethoxy-2',6-dimethylbenzophenone (U.S. Pat. No. 5,945,567); pencycuron, 1-(4-chlorobenzyl)-1-cyclopentyl-3-phenylurea (DE 27 32 257); penthiopyrad, (RS)—N-[2-(1,3-dimethylbutyl)-3-thienyl]-1-methyl-3-(trifluoromethyl)-1H-pyrazole-4-carboxamide (JP 10130268); propamocarb, propyl 3-(dimethylamino)propylcarbamate (DE 15 67 169); phthalide (DE 16 43 347); toloclofos-methyl, O-2,6-dichloro-p-tolyl O,O-dimethyl phosphorothioate (GB 14 67 561); quintozene, pentachloronitrobenzene (DE 682 048); zoxamide, (RS)-3,5-dichloro-N-(3-chloro-1-ethyl-1-methyl-2-oxopropyl)-p-toluamide [CAS RN 156052-68-5]; azoxystrobin, methyl 2-{2-[6-(2-Cyano-1-vinylpenta-1,3-dienyloxy)pyrimidin-4-yloxy]phenyl}-3-methoxyacrylate (EP 382 375), dimoxystrobin, (E)-2-(methoxyimino)-N-methyl-2-[α-(2,5-xylyloxy)-o-tolyl]acetamide (EP 477 631); enestroburin, methyl 2-{2-[3-(4-chlorophenyl)-1-methylallylideneaminooxymethyl]phenyl}-3-methoxyacrylate (EP 936 213); fluoxastrobin, (E)-{2-[6-(2-chlorophenoxy)-5-fluoropyrimidin-4-yloxy]phenyl}(5,6-dihydro-1,4,2-dioxazin-3-yl)methanone O-methyloxime (WO 97/27189); kresoxim-methyl, methyl (E)-methoxyimino[α-(o-tolyloxy)-o-tolyl]acetate (EP 253 213); metominostrobin, (E)-2-(methoxyimino)-N-methyl-2-(2-phenoxyphenyl)acetamide (EP 398 692); orysastrobin, (2E)-2-(methoxyimino)-2-{2-[(3E,5E,6E)-5-(methoxyimino)-4,6-dimethyl-2,8-dioxa-3,7-diazanona-3,6-dien-1-yl]phenyl}-N-methylacetamide (WO 97/15552); picoxystrobin, methyl 3-methoxy-2-[2-(6-trifluoromethylpyridin-2-yloxymethyl)phenyl]acrylate (EP 278 595); pyraclostrobin, methyl N-{2-[1-(4-chlorophenyl)-1H-pyrazol-3-yloxymethyl]phenyl}(N-methoxy)carbamate (WO 96/01256); trifloxystrobin, methyl (E)-methoxyimino-{(E)-α-[1-(α,α,α-trifluoro-m-tolyl)-ethylidenaminooxy]-o-tolyl}acetate (EP 460 575); captafol, N-(1,1,2,2-tetrachloroethylthio)cyclohex-4-en-1,2-dicarboximide (Phytopathology, vol. 52, p. 754 (1962)); captan, N-(trichloromethyl-thio)cyclohex-4-ene-1,2-dicarboximide (U.S. Pat. No. 2,553,770); dichlofluanid, N-dichlorofluoro-methyl-thio-N',N'-dimethyl-N-phenylsulfamide (DE 11 93 498); folpet, N-(trichlormethylthio)-phthalimide (U.S. Pat. No. 2,553,770); tolylfluanid, N-dichlorofluoromethylthio-N',N'-dimethyl-N-p-tolyl-sulfamide (DE 11 93 498); dimethomorph, 3-(4-chlorophenyl)-3-(3,4-dimethoxyphenyl)-1-morpholin-4-yl-propenone (EP 120 321); flumetover, 2-(3,4-dimethoxyphenyl)-N-ethyl-α,α,α-trifluoro-N-methyl-p-toluamide [AGROW no. 243, 22 (1995)]; flumorph, 3-(4-fluorophenyl)-3-(3,4-dimethoxyphenyl)-1-morpholin-4-ylpropenone (EP 860 438); 5-amino-2-isopropyl-3-oxo-4-o-tolyl-2,3-dihydropyrazole-1-carbothionic acid S-allyl ester (CN1939128).

The preparation and the fungicidal activity of the pesticides which are described in the IUPC nomenclature are also known (cf. Can. J. Plant Sci. 48(6), 587-94, 1968; EP-A 141 317; EP-A 152 031; EP-A 226 917; EP-A 243 970; EP-A 256 503; EP-A 428 941; EP-A 532 022; EP-A 1 028 125; EP-A 1 035 122; EP-A 1 201 648; EP-A 1 122 244, JP 2002316902; DE 19650197; DE 10021412; DE 102005009458; U.S. Pat. Nos. 3,296,272; 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624, WO 11/028657, WO2012/168188, WO 2007/006670, WO 2011/77514; WO13/047749, WO 10/069882, WO 13/047441, WO 03/16303, WO 09/90181, WO 13/007767, WO 13/010862, WO 13/127704, WO 13/024009, WO 13/024010, WO 2013/047441, WO 13/162072, WO 13/092224).

The biopesticides of group L), their preparation and their pesticidal activity, against harmful fungi or insects, for example, are known (e-Pesticide Manual V 5.2 (ISBN 978 1 901396 85 0) (2008-2011); http://www.epa.gov/opp00001/biopesticides/, see the product lists given therein;

http://www.omri.org/omri-lists, see the lists given therein; Bio-Pesticides Database BPDB http://sitem.herts.ac.uk/aeru/bpdb/, see link A to Z therein).

The biopesticides of group L1) and/or L2) also have insecticidal, acaricidal, molluscicidal, pheromone-like, nematicidal, plant stress-reducing, plant growth-regulating, plant growth-promoting, and/or yield-increasing activity.

The biopesticides of group L3) and/or L4) also have fungicidal, bactericidal, virucidal, plant defense-activating, plant stress-reducing, plant growth-regulating, plant growth-promoting and/or yield-increasing effect.

The biopesticides of group L5) and L6) also have fungicidal, bactericidal, virucidal, plant defense-activating, insecticidal, acaricidal, molluscicidal, pheromone-like and/or nematicidal activity.

Many of these biopesticides have been deposited using the deposition numbers mentioned here (the prefixes relate to the abbreviations of the corresponding culture collection), identified in the literature, and/or are available commercially: aluminum silicate (Screen™ Duo von Certis LLC, USA), Agrobacterium radiobacter K1026 (e.g., NoGall® from BASF Agricultural Specialties Pty Ltd, Australia), A. radiobacter K84 (Nature 280, 697-699, 1979; e.g., GallTroll® from AG Biochem, Inc., C, USA), Ampelomyces quisqualis M-10 (e.g., AQ 10® from Intrachem Bio GmbH & Co. KG, Germany), Ascophyllum nodosum (Norwegian kelp, Brown kelp) extract or filtrate (e.g., ORKA GOLD from BASF Agricultural Specialities (Pty) Ltd., South Africa; or Goemar® from Laboratoires Goemar, France), Aspergillus flavus NRRL 21882 isolated from a peanut in Georgia, 1991 by USDA, National Peanut Research Laboratory (e.g., in Afla-Guard® from Syngenta, CH), mixtures of Aureobasidium pullulans DSM 14940 and DSM 14941 (e.g., blastospores in BlossomProtect® from bio-ferm GmbH, Germany), Azospirillum amazonense SpY2 (DN: BR 11140; Proc. 9$^{th}$ Int. and 1$^{st}$ Latin American PGPR meeting, Quimara, Medellin, Columbia 2012, p. 60, ISBN 978-958-46-0908-3), A. brasilense AZ39 (also designated Az 39; INTA Az-39; Eur. J. Soil Biol 45(1), 28-35, 2009), A. brasilense XOH (e.g., AZOS from Xtreme Gardening, USA or RTI Reforestation Technologies International; USA), A. brasilense BR 11002 (Proc. 9$^{th}$ Int. and 1$^{st}$ Latin American PGPR meeting, Quimara, Medellin, Columbia 2012, p. 60, ISBN 978-958-46-0908-3), A. brasilense Sp245 (BR 11005; e.g., in GELFIX Gramineas from BASF Agricultural Specialties Ltd., Brazil), A. brasilense strains Ab-V5 and Ab-V6 (e.g., in AzoMax from Novozymes BioAg Produtos papra Agricultura Ltda., Quattro Barras, Brazil or SimbioseMaiz® from Simbiose-Agro, Cruz Alta, RS, Brazil; Plant Soil 331, 413-425, 2010), A. lipoferum BR 11646 (Sp31) (Proc. 9$^{th}$ Int. and 1$^{st}$ Latin American PGPR meeting, Quimara, Medellin, Columbia 2012, p. 60), Bacillus altitudinis 41KF2b (DSM 21631; Int. J. Syst. Evol. Microbiol. 56(7), 1465-1473, 2006), Bacillus amyloliquefaciens strains AP-136 (NRRL B-50614 and B-50330), AP-188 (NRRL B-50615 and B-50331), AP-218 (NRRL B-50618), AP-219 (NRRL B-50619 and B-50332), and AP-295 (NRRL B-50620 and B-50333) all known from U.S. Pat. No. 8,445,255; B. amyloliquefaciens IT-45 (CNCM 1-3800) (e.g., Rhizocell C from ITHEC, France), B. amyloliquefaciens IN937a (J. Microbiol. Biotechnol. 17(2), 280-286, 2007; e.g., BioYield® from Gustafson LLC, TX, USA), B. amyloliquefaciens spp. plantarum D747 (US 20130236522 A1; FERM BP-8234; e.g., Double Nickel™ 55 WDG or Double Nickel™ LC from Certis LLC, USA), B. amyloliquefaciens spp. plantarum FZB24 isolated from phytopathogen-infected soil of a sugar beet field in Brandenburg, Germany (also designated SB3615; DSM ID 96-2; J. Plant Dis. Prot. 105, 181-197, 1998; e.g., Taegro® from Novozyme Biologicals, Inc., USA), B. amyloliquefaciens spp. plantarum SB3615vPPI, a phage-resistant variant of FZB24 (MRRL B-50349; US 2011/023045 A1; from Novozyme Biologicals, Inc., USA), B. amyloliquefaciens ssp. plantarum FZB42, isolated from phytopathogen-infected soil of a sugar beet field in Brandenburg, Germany (J. Plant Dis. Prot. 105, 181-197, 1998; DSM 23117; e.g., RhizoVital® 42 from AbiTEP GmbH, Berlin, Germany), B. amyloliquefaciens ssp. plantarum GB03 (also designated GBO3; ATCC SD-1397; Phytopathol. 86(11), p. 36, 1996; e.g., Kodiak® or BioYield® from Gustafson, Inc., USA; or Companion® from Growth Products, Ltd., White Plains, N.Y. 10603, USA), B. amyloliquefaciens ssp. plantarum MBI600, also designated 1430 (NRRL B-50595; Int. J. Microbiol. Res. 3(2) (2011), 120-130; US 2012/0149571 A1; e.g., Integral®, Subtilex® NG from BASF Corp., USA), B. amyloliquefaciens spp. plantarum TJ1000 (also designated 1BE; CA 2471555 A1; ATCC BAA-390; e.g., QuickRoots™ from TJ Technologies, Watertown, S. Dak., USA), B. cereus CNCM 1-1562 (U.S. Pat. No. 6,406,690), B. chitinosporus AQ746 isolated from roots in Saskatchewan, Canada (NRRL B-21618; U.S. Pat. No. 5,733,544; AgraQuest now Bayer CropScience LP, USA), B. firmus CNCM 1-1582 (WO 2009/126473, WO 2009/124707, U.S. Pat. No. 6,406,690; e.g., Votivo® from Bayer CropScience LP, USA), B. megaterium strains H491 (NRRL B-50769), M018 (NRRL B-50770) and J142 (NRRL B-50771), all known from US 2014/0051571 A1 from Marrone BioInnovations, Inc., USA; B. mojavensis AP-209 (NRRL B-50616; U.S. Pat. No. 8,445,255), B. mycoides AQ726 (NRRL B-21664; U.S. Pat. No. 5,906,818; from Bayer Crop Science, Germany), B. mycoides strain J (e.g., BmJ WG from Certis, USA against potato virus Y), B. pumius GB34 (ATCC 700814; e.g., YieldShield® from Gustafson LLC, TX, USA), B. pumilus GHA 180 isolated from rhizospheres of apple tree in Mexico (IDAC 260707-01; e.g., in PRO-MIX® BX from Premier Horticulture, 1, avenue Premier, Rivie're-du-Loup, Quebec, Canada G5R6C1), B. pumilus KFP9F (NRRL B-50754; WO 2014/029697; e.g., BAC-UP or FUSION-P from BASF Agricultural Specialities (Pty) Ltd., South Africa), B. pumilus INR-7, otherwise designated as BU-F22 and BU-F33 (NRRL B-50185, NRRL B-50153; U.S. Pat. No. 8,445,255), B. pumius QST 2808 (NRRL B-30087; e.g., Sonata® or Ballad® Plus from AgraQuest Inc., USA), B. solisalsi AP-217 (NRRL B-50617; U.S. Pat. No. 8,445,255), B. subtilis CX-9060 (Federal Register 77(7), 1633-1637; from Certis U.S.A., L.L.C.), B. subtilis FB17, also designated as UD 1022 or UD10-22, isolated from beetroot roots in North America (ATCC PTA-11857; System. Appl. Microbiol. 27, 372-379, 2004; US 2010/0260735; WO 2011/109395); B. subtilis GB07 (Phytopathol. 86(11), p. 36, 1996; Epic® from Gustafson, Inc., USA), B. subtilis QST-713, isolated from a California peach orchard in 1995 (NRRL B-21661; e.g., Rhapsody®, Serenade® MAX or Serenade® ASO from AgraQuest Inc., USA), B. thuringiensis ssp. aizawai ABTS-1857 (also designated ABG-6346; ATCC SD-1372; e.g., XenTari® from BioFa AG, Münsingen, Germany), B. t. ssp. aizawai SAN 401 I, ABG-6305 (WO 2013/087709); Bacillus t. ssp. israelensis AM65-52 of serotype H-14 (ATCC SD-1276; e.g., VectoBac® from Valent BioSciences, IL, USA), Bacillus thuringiensis ssp. kurstaki SB4 (NRRL B-50753; e.g., Beta Pro® from BASF Agricultural Specialities (Pty) Ltd., South Africa), B. t. ssp. kurstaki ABTS-351, identical to HD-1 (ATCC SD-1275; e.g., Dipel® DF from Valent BioSciences, IL, USA), B. t. ssp. kurstaki EG 2348 (NRRL B-18208; e.g., Lepinox® or Rapax® from CBC (Europe) S.r.I., Italy), *B. t.* ssp. *tenebrionis* DSM 2803 of serotype H 8a, 8b (identical to NRRL B-15939; EP 0 585 215 B1; Mycogen Corp.), *B. t.* ssp. *tenebrionis* NB-125 (also designated SAN 418 I or ABG-6479; EP 0 585 215 B1; DSM 5526; earlier production strain from Novo-Nordisk), *B. t.* ssp. *tenebrionis* NB-176 (or NB-176-1; a gamma-irradiated, induced, high-productivity mutant of strain NB-125; EP 585 215 B1; DSM 5480; e.g., Novodor® from Valent BioSciences, Switzerland), *Beauveria bassiana* JW-1 (ATCC 74040; e.g., Naturalis® from CBC (Europe) S.r.I., Italy), *B. bassiana* DSM 12256 (US 200020031495; e.g., BioExpert® SC from Live Systems Technology S.A., Columbia), *B. bassiana* GHA (ATCC 74250; e.g., Botani-Gard® 22WGP from Laverlam Int. Corp., USA), *B. bassiana* PPRI 5339 (ARSEF 5339; NRRL 50757; e.g., Broad-Band® from BASF Agricultural Specialities (Pty) Ltd., South Africa), *B. brongniartii* for controlling cockchafer (J. Appl. Microbiol. 100(5),1063-72, 2006; e.g., Melocont® from Agrifutur, Agrianello, Italy), *Bradyrhizobium* sp. (e.g., Vault® from BASF Corp., USA), *B.* sp. (*Arachis*) CB1015 presumably originally collected in India (IITA 1006, USDA 3446; from Australian Inoculants Research Group; http://gaseeds.com/au/inoculant_applic.php). *B.* sp. (*Arachis*) strains deposited with SEMIA and known from FEMS Microbiol. Letters 303(2), 123-131, 2010; Revista Brasileira de Ciencia do Solo 35(3), 739-742, 2011, ISSN 0100-0683: SEMIA 6144, SEMIA 6462 (BR 3267) and SEMIA 6464 (BR 3262); *B.* sp. (*Vigna*) PNLO1 (Bisson and Mason, Apr. 29, 2010, Project Report, Worcester Polytechnic Institute, Worcester, Mass., USA: http://www.wpi.edu/Pubs/E-project/Available/E-project-042810-163614/; e.g., Vault® Peanut Liquid from BASF Corp., USA), *B. elkanii* SEMIA 587 (Appl. Environ. Microbiol. 73(8), 2635, 2007; e.g., GELFIX 5 from BASF Agricultural Specialties Ltd., Brazil), *B. elkanii* SEMIA 5019 (=29 W; Appl. Environ. Microbiol. 73(8), 2635, 2007; e.g., GELFIX 5 from BASF Agricultural Specialties Ltd., Brazil), *B. elkanii* USDA 76, *B. elkanii* USDA 94 *B. elkanii* USDA 3254, *B. elkanii* U-1301 and U-1302 (e.g., Nitragin® Optimize from Novozymes Bio As S.A., Brazil, or Nitrasec from soybean from LAGE y Cia, Brazil), *B. japonicum* (e.g., VAULT® from BASF Corp., USA), *B. japonicum* 532c isolated from a field in Wisconsin (Nitragin 61A152; Can. J. Plant. Sci. 70, 661-666, 1990; e.g., in Rhizoflo®, Histick®, Hicoat® Super from BASF Agricultural Specialities Ltd., Canada), *B. japonicum* E-109 variant of strain USDA 138 (INTA E109, SEMIA 5085; Eur. J. Soil Biol. 45, 28-35, 2009; Biol. Fertil. Soils 47, 81-89, 2011), *B. japonicum* G49 (MSDJ G49; C. R. Acad. Agric. Fr. 73, 163-171, 1987); *B. japonicum* strains deposited with SEMIA, known from Appl. Environ. Microbiol. 73(8), 2635, 2007: SEMIA 566 1966 isolated from a North-American inoculant and used in commercial Brazilian inoculants from years 1966 to 1978, SEMIA 586, originally isolated in 1961 in Maryland, USA, obtained in 1966 from Australia and used in Brazilian inoculants in 1977 (CB 1809, USDA 136, Nitragin 61A136, RCR 3407), SEMIA 5079, a natural variant from SEMIA 566, used since 1992 in commercial inoculants (CPAC 15; e.g., GELFIX 5 or ADHERE 60 from BASF Agricultural Specialties Ltd., Brazil), *B. japonicum* SEMIA 5080, a natural variant of SEMIA 586, used since 1992 in commercial inoculants (CPAC 7; e.g., GELFIX 5 or ADHERE 60 from BASF Agricultural Specialties Ltd., Brazil); *B. japonicum* TA-11 (TA11 NOD⁺) (NRRL B-18466; U.S. Pat. No. 5,021,076; Appl. Environ. Microbiol. 56, 2399-2403, 1990; e.g., VAULT® NP, from BASF Corp., USA), *B. japonicum* strains deposited with USDA, known from U.S. Pat. No. 7,262,151 and Appl. Environ. Microbiol. 60, 940-94, 1994: USDA 3 1914 isolated from *Glycine max* in Virginia (USA), USDA 31 (=Nitragin 61A164) of serogroup 31, isolated in 1941 from *Glycine max* in Wisconsin (USA), USDA 76, isolated from a plant passage of strain USDA 74 (serogroup 76) which was isolated in 1956 from *G. max* in California (USA), USDA 110 (=IITA 2121, SEMIA 5032, RCR 3427, ARS I-110 and Nitragin 61A89; serogroup 110), isolated in 1959 from *G. max* in Florida, USDA 121, isolated in 1965 from *G. max* in Ohio (USA) (Crop Science 26(5), 911-916, 1986); *B. japonicum* WB74 (e.g., Eco-Rhiz Soya from Plant Health Products (Pty) Ltd., South Africa; or soybean inoculant from Stimuplant CC, South Africa), *B. lupini* LL13, isolated from *Lupinus iuteus* nodules from French soils (deposited with INRA, France; http://agriculture.gouv.fr/IMG/pdf/ch20060216.pdf), *B. lupini* strains from Australia and known from Palta J. A., Berger J. B. (eds), Proceed. 12$^{th}$ International Lupin Conference, 14-18 Sep. 2008, Fremantle, Western Australia, International Lupin Association, Canterbury, New Zealand, 47-50, http://www.lupins.org/pdf/conference/2008/Agronomy%20and%20Production/John%20Howieson%20and%20G%20Hara.pdf; Appl. Environ. Microbiol. 71, 7041-7052, 2005; Australian J. Exp. Agricult. 36(1), 63-70, 1996: the strains WU425 isolated in Esperance, Western Australia from a non-Australian legume *Ornithopus compressus*, WSM471, isolated from *Ornithopus pinnatus* in Oyster Harbour, Western Australia, and WSM4024, isolated from lupines in Australia by the CRS during an investigation in 2005; *Burkholderia* sp. A396 (NRRL B-50319; WO 2013/032693; Marrone Bio Innovations, Inc., USA), *Candida oleophila* 1-182 (NRRL Y-18846; Phytoparasitica 23(3), 231-234, 1995; e.g., Aspire® from Ecogen Inc., USA;), *C. oleophila* strain 0 (NRRL Y-2317; Biological Control 51, 403-408, 2009), *Candida saitoana* (e.g., Biocure® [in a mixture with lysozyme] and BioCoat® from Micro Flo Company, USA (BASF SE) and Arysta), chitosan (e.g., Armour-Zen® from BotriZen Ltd., NZ), *Clonostachys rosea* f. *catenulate* (also designated *Gliocladium catenulatum*) J1446, isolated from Finnish soil (NJF seminar No. 389: Pest, disease and weed management in strawberry; Finland 8-9. November 2006 in NJF Report 2(10), 15-15, 2006; DSM 9212; e.g., Primastop® or Prestop® from Verdera Oy, Finland), *Chromobacterium subtsugae* PRAA4-1, isolated from soil taken from beneath an Eastern hemlock spruce (*Tsuga canadensis*) in the Catoctin Mountain Region of central Maryland, and (NRRL B-30655; e.g., Grandevo® from Marrone Bio Innovations, USA), *Coniothyrium* mini/tans CON/M/91-08 (WO 1996/021358; DSM 9660; e.g., Contans® WG, Intercept® WG from Prophyta Biologischer Pflanzenschutz GmbH, Germany), *Cryphonectria parasitica* (hypovirulent strains; Microbiol. Reviews 56(4), 561-576, 1992; e.g., the product *Endothia parasitica* from CNICM, France), *Cryptococcus albidus* (e.g., YIELD PLUS® from Anchor Bio-Technologies, South Africa), *Cryptophlebia leucotreta* granulovirus (CrleGV) (e.g., CRYPTEX from Adermatt Biocontrol, Switzerland), *Cydia pomonella* granulovirus (CpGV) V03 (DSM GV-0006; e.g., Madex® Max from Andermatt Biocontrol, Switzerland), CpGV V22 (DSM GV-0014; e.g., Madex® Twin from Adermatt Biocontrol, Switzerland), *Delftia acidovorans* RAY209 (ATCC PTA-4249; WO 2003/57861; e.g., BioBoost® from Brett Young, Winnipeg, Canada), *Dilophosphora alopecuri* (FarmNote 396, February 2010, Department of Agriculture and Food, Government of Western Australia; e.g., Twist Fungus from BASF Agricultural Specialties Pty Ltd, Australia), *Ecklonia maxima* (kelp)

Extract (J. Ecological Engineering 14(1), 48-52, 2013; e.g., KELPAK SL from Kelp Products Ltd, South Africa), *Flavobacterium* sp. H492 (ATCC B-505584; WO 2013/138398; e.g., MBI-302 from Marrone Bio Innovations, USA for controlling soybean cyst nematode), formononetin (U.S. Pat. No. 5,002,603; e.g., Myconate® from Plant Health Care plc, U.K.), *Fusarium oxysporum* Fo47 (non-pathogenic strain isolated from a suppressive soil at Châteaurenard, France; Appl. Environ. Microbiol 68(8), 4044-4060, 2002; Fusaclean® from Natural Plant Protection, N.P.P. (Société Anonyme) Route d'Artix F-64150 Nogueres, France), *F. oxysporum* 251/2RB (Prevention Today vol. 2, n. 1-2, 47-62, 2006; e.g., Biofox® C from S.I.A.P.A., Italy); *Glomus intraradices* (e.g., Myc® 4000 from ITHEC, France), *Glomus intraradices* RTI-801 (e.g., MYKOS from Xtreme Gardening, USA or RTI Reforestation Technologies International; USA), grapefruit seeds and grapefruit flesh extract (e.g., BC-1000 from Chemie S.A., Chile), harpin (alpha-beta) protein (Science 257, 85-88, 1992; e.g., Messenger™ or HARP-N-Tek from Plant Health Care plc, U.K.), *Helicoverpa armigera* nucleopolyhedrovirus (HearNPV) (J. Invertebrate Pathol. 107, 112-126, 2011; e.g., Helicovex® from Adermatt Biocontrol, Switzerland), *Heterorhabditis bacteriophora* (e.g., Nemasys® G from BASF Agricultural Specialities Limited, UK), *Isaria fumosorosea* Apopka-97 (ATCC 20874; Biocontrol Science Technol. 22(7), 747-761, 2012; e.g., PFR-97™ or PreFeRal® from Certis LLC, USA), *I. fumosorosea* FE 9901 (ARSEF 4490; Biocontrol Science Technol. 22(7), 747-761, 2012; e.g., blastospores in NoFly™ WP from Natural Industries, Inc., Houston, Tex., USA or from Novozymes, U.S.A.), cis-Jasmone (U.S. Pat. Nos. 6,890,525; 8,221,736; Plant Bioscience Limited, Norwich, U.K.), Laminarin (e.g., in Vacciplant® from Laboratoires Goemar, St. Malo, France or Stahler SA, Switzerland), *Lecanicillium longisporum* KV42 and KV71 (e.g., Vertalec® from Koppert BV, Netherlands), *L. muscarium* Ve6 (also designated KV01; IMI 19-79, CABI 268317, CBS 102071, ARSEF 5128; e.g., Mycotal® from Koppert BV, Netherlands), *Lysobacter antibioticus* 13-1 (Biological Control 45, 288-296, 2008), *L. antibioticus* HS124 (Curr. Microbiol. 59(6), 608-615, 2009), *L. enzymogenes* 3.1T8 (Microbiol. Res. 158, 107-115, 2003; Biological Control 31(2), 145-154, 2004); *Mesorhizobium* spp. Strains known from Soil Biol. Biochem. 36(8), 1309-1317, 2004; Plant and Soil 348(1-2), 231-243, 2011: M. sp. WSM1271, collected in Sardinia, Italy, from the plant host *Biserrula pelecinus*, M. sp. WSM 1497, collected on Mykonos, Greece, from *Biserrula pelecinus*, *Mesorhizobium ciceri* CC1192, collected in Israel from *Cicer arietinum* nodules (UPM 848, CECT 5549; Can. J. Microbiol. 48, 279-284, 2002; from Horticultural Research Station, Gosford, Australia), *M. huakuii* HN3015, isolated from *Astralagus sinicus* in a rice field in Southern China (World J. Microbiol. Biotechn. 23(6), 845-851, 2007, ISSN 0959-3993), *M. loti* CC829, isolated from *L. ulginosus* nodules in the USA (NZP 2012; commercial inoculant for *Lotus pedunculatus* and *L. ulginosus* in Australia), and *M. loti* SU343, isolated from host nodules in the USA (commercial inoculant for *Lotus corniculatus* in Australia); *Metarhizium anisopliae* FI-1045 (AGAL V10/0104285; WO 2012/018266; e.g., Biocane® from BASF Agricultural Specialties Pty Ltd, Australia), *M. anisopliae* var. *anisopliae* F52, also called 275 or V275 (DSM 3884, ATCC 90448; e.g., Met52® Novozymes Biologicals BioAg Group, Canada), *M. anisopliae* ICIPE 69, isolated from a soil sample originating from the Democratic Republic of Congo (DRC) and obtained in 1990 using the Galleria bait method (e.g., Metathripol from ICIPE, Nairobi, Kenya), *M. anisopliae* var. *acridum* IMI 330189, isolated from *Ornithacris cavroisi* in Niger (NRRL 50758; e.g., Green Muscle® from BASF Agricultural Specialities (Pty) Ltd., South Africa), *M. a.* var. *acridum* FI-985, isolated in 1979 from a migratory locust, *Austracris guttulosa* (Walker), in the vicinity of Rockhampton, Queensland, Australia, (ARSEF 324; Memoirs of the Entomological Society of Canada 171, 287-300, 1997; e.g., Green Guard® SC from BASF Agricultural Specialties Pty Ltd, Australia), *Metschnikowia fructicola* 277, isolated from the surface of grapes (cv. Superior) cultivated in the central region of Israel (U.S. Pat. No. 6,994,849; NRRL Y-30752; e.g., Shemer® from Agrogreen, Israel, now sold by Bayer CropSciences, Germany), *Microdochium dimerum* L13 (CNCM 1-3141; e.g., Antibot® from Agrauxine, France), *Microsphaeropsis ochracea* P130A, isolated in 1993 from apple leaves of an abandoned orchard, St-Joseph-du-Lac, Quebec, Canada (ATCC 74412; Mycologia 94(2), 297-301, 2002), *Muscodor albus* QST 20799, also designated 620, originally isolated from the bark of a cinnamon tree in Honduras (NRRL 30547; e.g., Muscudor™ or QRD300 from AgraQuest, USA), *Muscodor albus* SA-13 (NRRL B-50774; US 2014/0086879 A1; e.g., MBI-601-EP from Marrone BioInnovations, Inc., USA), Neem oil (e.g., Trilogy®, Triact® 70 EC from Certis LLC, USA), *Nomuraea rileyi* strains SA86101, GU87401, SR86151, CG128 and VA9101 (Braz. Arch. Biol. Technol. 46(1), 13-19, 2003; WO 2013/110594), *Paecilomyces lilacinus* 251, isolated from infected nematode eggs in the Philippines (AGAL 89/030550; WO1991/02051; Crop Protection 27, 352-361, 2008; e.g., BioAct®/MeloCon® from Prophyta, Germany), *P. lilacinus* DSM 15169 (e.g., Nemata® SC from Live Systems Technology S.A., Columbia), *P. lilacinus* BCP2 (NRRL 50756; Acta agriculturae Slovenia, 101-2, 263-275, 2013; e.g., PL Gold from BASF Agricultural Specialities (Pty) Ltd., South Africa), *Paenibacillus alvei* NAS6G6 (WO 2014/029697; NRRL B-50755; e.g., BAC-UP from BASF Agricultural Specialities (Pty) Ltd., South Africa, in a mixture with *Bacillus pumilus* KFP9F), *P. polymyxa* PKB1 (ATCC 202127; Can. J. Microbiol. 48(2), 159-169, 2002), *Pantoea agglomerans* E325 (NRRL B-21856; Phytopathol. 101(10), 1234-41, 2011; Trees 26, 227-238, 2012; Bloomtime Biological™ from Northwest Agricultural Products, Inc., USA), *Pantoea vagans* (formerly agglomerants) C9-1, originally isolated in 1994 from apple stem tissue for the inoculation of apple fire blight (J. Bacteriol. 192(24), 6486-6487, 2010; e.g., Blight-Ban C9-1® from NuFrams America Inc., USA), *Pasteuria* sp. ATCC PTA-9643 (WO 2010/085795), *Pasteuria* sp. Ph3, isolated from turf grass soil samples collected on the DeBary Golf course in central Florida (ATCC SD-5832; WO 2012/064527; for controlling the nematode *Hoplolaimus galeatus* from *Pasteuria* Bioscience, Inc. now Syngenta Crop Protection, LLC, USA), *Pasteuria* sp. Pr3, isolated from soil samples collected in the South Eastern USA (ATCC SD-5834; for controlling an nematode *Rotylenchulus reniformis*, potentially of the species *P. ramosa*; Naviva® ST from Syngenta Crop Protection, LLC, USA), *P. nishizawae* (WO 2010/80619), *P. nishizawae* Pn1 (Federal Register 76(22), 5808, 2. February, 2011; ATCC SD-5833; e.g., Clariva™ PN from Syngenta Crop Protection, LLC, USA), *P. penetrans* (U.S. Pat. No. 5,248,500; Del Monte Corp.), *P. ramosa* (WO 2010/080619), *P. thornea* (WO 2010/080619), *P. usgae* BL1 (ATCC SD-5835; J. Nematol. 42(2): 87-90, 2010; ibid. 43(2), 101-109, 2011; e.g., Econem™ for controlling *Belonolaimus longicaudatus* from *Pasteuria* Bio-Science now Syngenta, sold by Harell's LLC, Florida, USA for use on turf for controlling *Belonolaimus longicaudatus*),

*Penicillium bilaiae* (also designated *P. bilai*) strains ATCC 18309 (=ATCC 74319), ATCC 20851 and/or ATCC 22348 (=ATCC 74318), originally isolated from the soil in Southern Alberta (Fertilizer Res. 39, 97-103, 1994; Can. J. Plant Sci. 78(1), 91-102, 1998; U.S. Pat. No. 5,026,417, WO 1995/017806; e.g., Jump Start®, Provide® from Novozymes Biologicals BioAg Group, Canada), *P. bilaiae* NRRL 50162 and NRRL 50169 (WO 2010/037228), *Phlebiopsis gigantea* (e.g., RotStop® from Verdera Oy, Finland), *Pichia anomala* WRL-076 (NRRL Y-30842; U.S. Pat. No. 8,206,972), potassium bicarbonate (e.g., Amicarb® from Stahler SA, Switzerland), potassium silicate (e.g., Sil-MA-TRIX™ from Certis LLC, USA), *Pseudozyma flocculosa* PF-A22 UL (e.g., Sporodex® L from Plant Products Co. Ltd., Canada), *Pseudomona* ssp. Proradix (DSM 13134; WO 2001/40441, e.g., PRORADIX from Sourcon Padena GmbH & Co. KG, Hechinger Str. 262, 72072 Tubingen, Germany), *P. chloraphis* MA 342 (Microbiology Monographs 18, 21-43, 2011; e.g., Cerall® or Cedemon® from BioAgri AB, Uppsala, Sweden or Intrachem Bio Deutschland GmbH & Co. KG, Bad Camberg, Germany), *P. fluorescens* (e.g., in Bio Cure-B from T. Stanes & Company Limited, India; or in Blight-End from Agri Naturals, Mumbai, India), *P. fluorescens* A506 (Phytopathol 97(2), 244-249, 2007; ATCC 31948; e.g., BlightBan® from NuFarm Americas, Inc., Morrisville, N.C., USA), *P. fluorescens* ATCC 13525 of biovar I=biotype A; originally isolated from pre-filter tanks in England (DSM 50090; registered for use in Canada), *P. fluorescens* CHA0 (Mol. Plant Microbe Interact. 5(1), 4-13, 1992), *P. fluorescens* CL 145A (J. Invertebr. Pathol. 113(1), 104-14, 2013; e.g., Zequanox® from Marrone BioInnovations, Davis, Calif., USA), *P. fluorescens* NCIB 12089 (EP 0210734 A1; Victus® from Mauri Laboratories, 9 Moorebank Ave., Moorebank, NSW 2170, Australia), *P. fluorescens* Pf-5, isolated from the root surface of cotton (ATCC BAA-477), *P. putida* ATCC 202153 (EMBRAPA 63/88 4 B; WO 2004/0245865), *Pythium oligandrum* DV 74 (US 2013/0035230; ATCC 38472; e.g., Poyversum® from Remeslo SSRO, Biopreparaty, Czech Rep. and from Gowan, USA), *Reynoutria sachalinensis* extract (EP 0307510 B1; e.g., Regalia® SC from Marrone BioInnovations, Davis, Calif., USA or Milsana® from BioFa AG, Germany), *Rhizobium leguminosarum* bv. *phaseoli* (e.g., RHIZO-STICK from BASF Corp., USA), *R. leguminosarum* bv. *phaseoli* RG-B10 (USDA 9041; from Int. J. Syst. Bacteriol. 46(1), 240-244, 1996; Int. J. Syst. Evol. Microbiol. 50, 159-170, 2000; e.g., Nodulator® dry bean in Africa, HiStick NT dry bean in US, and Nodulator® dry bean in Canada from BASF Corp., USA, or BASF Agricultural Specialties Ltd., Canada), *R. l.* bv. *trifolii* CB782 (Nodulaid® peat for Kenia white clover from BASF Agricultural Specialties Pty Ltd, Australia), *R. l.* bv. *trifolii* CC275e (Nodulaid® peat for NZ white clover from BASF Agricultural Specialties Pty Ltd, Australia), *R. l.* bv. *trifolii* CC283b (ICMP 4073b; Proc. New Zealand Grassland Assoc. 56, 101-105, 1994; Microbiol. 153, 3184-3195, 2007; Nodulaid® peat for kaukasia clover from BASF Agricultural Specialties Pty Ltd, Australia), *R. l.* bv. *trifolii* CC1099 (Inoculating Legumes: A Practical Guide, ed. Grain Research and Development Corporation, 2012, ISBN 978-1-921779-45-9; e.g., Nodulaid® peat for sainfoin from BASF Agricultural Specialties Pty Ltd, Australia), *R. l.* bv. *trifolii* RP113-7 (Appl. Environ. Microbiol. 44(5), 1096-1101, 1982; e.g., Dormal® from BASF Corp., USA), *R. l.* bv. *trifolii* TA1 (Appl. Environ. Microbiol. 49(1), 127-131, 1985; e.g., Nodulaid® peat for white clover from BASF Agricultural Specialties Pty Ltd, Australia), *R. l.* bv. *trifolii* strain WSM1325, isolated in 1993 from the Greek island of Serifos (Stand. Genomic Sci. 2(3), 347-356, 2010; Inoculating Legumes: A Practical Guide, ed. Grain Research and Development Corporation, 2012, ISBN 978-1-921779-45-9; Nodulaid® peat for white clover and Nodulator® granules for burrowing clover from BASF Agricultural Specialties Pty Ltd, Australia, for a broad spectrum of annual clover of Mediterranean origin), *R. l.* bv. *trifolii* Stamm WSM2304, isolated in 1998 from *Trifolium polymorphum* in Uruguay (Stand. Genomic Sci. 2(1), 66-76, 2010), *R. l.* bv. *viciae* P1NP3Cst, a streptomycin-resistant mutant of P1 NP3C, isolated from pea root nodules at Bretenière, France (also designated 1435; New Phytol. 176, 680-690, 2007; ibid. 179(1), 224-235, 2008; e.g., Nodulator® PL Peat Granule from BASF Corp., USA; or Nodulator® XL PL from BASF Agricultural Specialties Ltd., Canada), *R. l.* bv. *viciae* RG-P2, also designated P2, isolated from pea root nodules at Saskatchewan, Canada (e.g., RhizUP peat for peas and lentils in Canada from BASF Agricultural Specialties Ltd., Canada), *R. l.* bv. *viciae* SU303 (e.g., Nodulaid® Group E from BASF Agricultural Specialties Pty Ltd, Australia), *R. l.* bv. *viciae* WSM1455 (e.g., Nodulaid® Group F from BASF Agricultural Specialties Pty Ltd, Australia), *R. tropici* CC511 (Agronomy, N.Z. 36, 4-35, 2006; e.g., Nodulaid® peat for French bean from BASF Agricultural Specialties Pty Ltd, Australia) *R. tropici* CIAT 899, isolated in Columbia (SEMIA 4077; Rev. Cienc. Agron. 44(4) Fortaleza October/December 2013; e.g., Nitrafix® FEIJÃO peat for beans from BASF Agricultural Specialties Ltd., Brazil in a mixture with strain SEMIA 4080), *R. tropici* H12, isolated at Planaltina, DF, Cerrados, Brazil (SEMIA 4088; Appl. Microbiol. Biotechnol. 93(5), 2035-49, 2012; e.g., Nitrafix® FEIJÃO from BASF Agricultural Specialties Ltd., Brazil), *R. tropici* PRF 81, isolated at Parana, Brazil (SEMIA 4080; Soil Biology & Biochemistry 39, 867-876, 2007; BMC Microbiol. 12, 84, 2012; Nitrafix® FEIJÃO peat for beans from BASF Agricultural Specialties Ltd., Brazil in a mixture with strain SEMIA 4077), *Sinorhizobium meliloti* RCR2011, also designated 2011 or SU47 (MSDJ0848; Mol. Gen. Genomics 272, 1-17, 2004; e.g., Dormal® Alfalfa & Lucerne from BASF Corp., USA; Nitragin® Gold from Novozymes Biologicals BioAg Group, Canada), *Sphaerodes mycoparasitica* SMCD2220, also designated SMCD2220-01 (IDAC 301008-01; WO 2011/022809), *Spodoptera littoralis* nucleopolyhedrovirus (SpliNPV) (e.g., in LITTOVIR from Adermatt Biocontrol, Switzerland), *Steinernema carpocapsae* (e.g., Millenium® from BASF Agricultural Specialities Limited, UK), *S. feltiae* (Nemashield® from BioWorks, Inc., USA; Nemasys® from BASF Agricultural Specialities Limited, UK), *S. kraussei* L137 (Nemasys® L from BASF Agricultural Specialities Limited, UK), *Streptomyces galbus* AQ6047 (NRRL 30232; WO 2012/135763; AgraQuest now Bayer CropScience LP, USA); *S. galbus* M1064 (NRRL 50334; WO 2012/135763; AgraQuest now Bayer CropScience LP, USA); *S. griseoviridis* K61 (Crop Protection 25, 468-475, 2006; e.g., Mycostop® from Verdera Oy, Espoo, Finland), *S. lydicus* WYEC 108 (U.S. Pat. No. 5,403,584; e.g., Actinovate® from Natural Industries, Inc., USA), *S. violaceusniger* YCED-9 (U.S. Pat. No. 5,968,503; e.g., DT-9® from Natural Industries, Inc., USA), *Talaromyces flavus* V117b, isolated from soil (e.g., Protus® WG from Prophyta, Germany), *Trichoderma asperellum* SKT-1, isolated from the rhizosphere of Japanese blanket grass (FERM P-16510; J. Gen. Plant Pathol. 71(5), 351-356, 2005; e.g., Eco-Hope® from Kumiai Chemical Industry Co., Ltd., Japan), *T. asperellum* ICC 012, isolated from the soil in central Italy, and recognized as suppressing plant diseases (IMI 392716; e.g., Tenet WP, Remdier WP or Bioten WP from Isagro NC, USA, Bio-Tam™ from AgraQuest, USA), *T. asperellum* TV1, formerly *T. viride* (MUCL 43093; e.g., *T. viride* TV1 from Agribiotec srl, Italy or Xedavir from Xeda Italia, Italy), *T. atroviride* LC52 (e.g., Sentinel® from Agrimm Technologies Ltd, NZ), *T. atroviride* CNCM 1-1237 (e.g., Esquive® WG from Agrauxine S.A., France, e.g., against cut wound diseases in grape, and plant root pathogens), *T. fertile* JM41R (NRRL 50759; e.g., Trichoplus™ from BASF Agricultural Specialities (Pty) Ltd., South Africa), *T. gamsii* ICC 080 (IMI 392151; e.g., Tenet WP, Remdier WP, Bioten WP from Isagro NC, USA, Bio-Tam™ from AgraQuest, USA), *T. harzianum* T-22, also designated KRL-AG2 (ATCC 20847; BioControl 57, 687-696, 2012; e.g., Plantshield® from BioWorks Inc., USA or SabrEx™ from Advanced Biological Marketing Inc., Van Wert, Ohio, USA), *T. harzianum* T-35 and T-315 (ATCC 20691; EP 0133878 B1; e.g., Root Pro® from Mycontrol Ltd., Israel), *T. harzianum* T-39 (CNCM 1-952; EP 0466133 B2; e.g., Trichodex® or *Trichoderma* 2000® from Mycontrol Ltd., Israel and Makhteshim Ltd., Israel), mixture of *T. harzianum* and *T. viride* (e.g., Trichopel® from Agrimm Technologies Ltd, NZ), mixture of *T. harzianum* ICC012 and *T. viride* ICC080 (e.g., Remdier® WP from Isagro Ricerca, Italy), *T. polysporum* IMI 206039 (ATCC 20476; e.g., Binab® from BINAB Bio-Innovation AB, Sweden in a mixture with *T. atroviride* IMI 206040), *T. stromaticum* (e.g., Tricovab® from C.E.P.L.A.C., Brazil), *T. virens* GI-3, also designated G1-3 or GL-3 (CA 2471555 A1; ATCC 58678; e.g., QuickRoots™ from TJ Technologies, Watertown, S. Dak., USA in a mixture with *B. amyloliquefaciens* TJ1000), *T. virens* GL-21, also designated G1-21, isolated from a *sclerotium* from *Sclerotinia minor* (U.S. Pat. No. 7,429,477; e.g., Soilguard® 12G from Certis LLC, USA; EPA Registration Number: 70051-3 and EPA Establishment Number: 067250-IL-001), *T. virens* G-41, also designated 041, #41X or ABM 127, isolated from soil samples taken from *Aphanomyces*-suppressive bean fields in Livingston County, New York (ATCC 20906; U.S. Pat. No. 4,996,157; e.g., Rootshield® PLUS from BioWorks, Inc., USA), *T. viride* (J. Biological Control 23(1), 31-36, 2009; e.g., Trieco® from Ecosense Labs. (India) Pvt. Ltd., India; or Bio-Cure® F from T. Stanes & Co. Ltd., India), and *Ulocladium oudemansii* HRU3 (Agronomy 3, 632-647, 2013; e.g., Botry-Zen® from Botry-Zen Ltd, NZ).

The corresponding strains are available from culture collections and from the corresponding deposition locations (listed below by abbreviation: http://www.wfcc.info/ccinfo/collection/by_acronym/) such as the strains with the abbreviations AGAL or NMI from: National Measurement Institute, 1/153 Bertie Street, Port Melbourne, Victoria, Australia 3207; ATCC: American Type Culture Collection, 10801 University Blvd., Manassas, Va. 20110-2209, USA; BR: Embrapa Agrobiology Diazothrophic Microbial Culture Collection, P.O.Box 74.505, Seropedica, Rio de Janeiro, 23.851-970, Brazil; CABI or IMI: CABI Europe—International Mycological Institute, Bakeham Lane, Egham, Surrey, TW20 9TYNRRL, UK; CB: The CB *Rhizobium* Collection, School of Environment and Agriculture, University of Western Sydney, Hawkesbury, Locked Bag 1797, South Penrith Distribution Centre, NSW 1797, Australia; CBS: Centraalbureau voor Schimmelcultures, Fungal Biodiversity Centre, Uppsalaan 8, PO Box 85167, 3508 AD Utrecht, Netherlands; CC: Division of Plant Industry, CSIRO, Canberra, Australia; CNCM: Collection Nationale de Cultures de Microorganismes, Institute Pasteur, 25 rue du Docteur Roux, F-75724 PARIS Cedex 15; CPAC: Embrapa-Cerrados, CX.Postal 08223, Planaltina, DF, 73301-970, Brazil; DSM: Leibniz-lnstitut DSMZ-Deutsche Sammlung von Mikroorganismen und Zellkulturen GmbH, Inhoffenstrale 7 B, 38124 Braunschweig, Germany; IDAC: International Depositary Authority of Canada Collection, Canada; ICMP: International Collection of Microorganisms from Plants, Landcare Research, Private Bag 92170, Auckland Mail Centre, Auckland 1142, New Zealand; IITA: IITA, PMB 5320, Ibadan, Nigeria; INTA: Agriculture Collection Laboratory of the Instituto de Microbiologia y Zoologia Agricola (IMYZA), Instituto Nacional de Tecnologia Agropecuaria (INTA), Castelar, Argentina; MSDJ: Laboratoire de Microbiologie des Sols, INRA, Dijon, France; MUCL: Mycothèque de l'Université catholique de Louvain, Croix du Sud 2, box L7.05.06, 1348 Louvain-la-Neuve, Belgium; NCIMB or NICB: The National Collections of Industrial and Marine Bacteria Ltd., Torry Research Station, P.O. Box 31, 135 Abbey Road, Aberdeen, Scotland, AB9 8DG; Nitragin: Nitragin strain collection, The Nitragin Company, Milwaukee, Wis., USA, NRRL or ARSEF (collection of entomopathogenic fungi): ARS Culture Collection of the National Center for Agricultural Utilization Research, Agricultural Research Service, U.S. Department of Agriculture, 1815 North University Street, Peoria, Ill. 61604, USA; NZP: Department of Scientific and Industrial Research Culture Collection, Applied Biochemistry Division, Palmerston North, New Zealand; PPRI: ARC-Plant Protection Research Institute, Private Bag X134, Queenswood Pretoria, Gauteng, 0121, South Africa; SEMIA: FEPAGRO-Fundação Estadual de Pesquisa Agropecuária, Rua Gonçalves Dias, 570, Bairro Menino Deus, Porto Alegre/RS, Brazil; SRDI: SARDI, Adelaide, South Australia; USDA: U.S. Department of Agriculture, Agricultural Research Service, Soybean and Alfalfa Research Laboratory, BARC-West, 10300 Baltimore Boulevard, Building 011, Beltsville, Md. 20705, USA (Beltsville Rhiz. Cult. Catalog: http://pdf.usaid.gov/pdf_docs/PNAAW891.pdf); and WSM: Murdoch University, Perth, Western Australia. Further strains can be found at: http://gcm.wfcc.info/; http://www.landcareresearch.co.nz/resources/collections/icmp.

Jasmonic acid, its salts (jasmonates) or derivatives include without further limitation potassium, sodium, lithium, ammonium, dimethylammonium, isopropylammonium, diolammonium and ditriethanolammonium jasmonates; thus including methylesterjasmonate, jasmonamide, methyljasmonamide, jasmonic acid-L-amino acid (amide-linked) conjugates (e.g., conjugates with L-isoleucine, L-valine, L-leucine, or L-phenylalanine), 12-oxo-phytodienoic acid, coronatine, coronalone, coronafacoyl-L-serine, coronafacoyl-L-threonine, methyl ester of 1-oxo-indanoyl-isoleucine, methylester of 1-oxo-indanoyl-leucine, cis-jasmone, linoleic acid or derivatives thereof, and combinations thereof.

Humates are humic acids and fulvic acids extracted from a form of lignite and clay known as leonardite. Humic acids are organic acids which occur in humus and other materials derived from it, such as peat and certain bituminous coals. They have been demonstrated to increase fertilizer efficiency in respect of phosphates, and in respect of micronutrient uptake by plants, and to contribute to the development of the plant root system. A further pesticide in accordance with the present invention is wettable sulfur.

The above pesticides and combinations thereof represent preferred organic materials which, as particles according to the invention, can be treated with a nonampholytic quaternizable polymer which is water-soluble at 20° C., in accordance with the present invention, by coating, for example. Alternatively, seed can also be treated.

The coated particles obtainable therefrom can be stored or used further, for example, in the form of powder or granules; preferably, the coated particles can be stored and/or delivered in aqueous suspension (dispersion) form. In view of the coating of the particles and the resultant rearrangement of the surface charge, the corresponding particles can be stored and/or utilized in the form of dispersions and/or suspensions of relatively high concentration and stability and relatively low particle size. The reason for this is the significantly reduced tendency of the particles toward agglomeration.

A great advantage in crop protection also results, for the coated particles according to the present invention, in particular in the more uniform delivery of the particles especially on spraying; furthermore, on account of the improved adhesion of the coated particles to the treated plants, the corresponding seed and/or the agricultural land, there is more sustainable treatment of the plants or surfaces with the pesticide in question.

Delivery may be accomplished, for example, by spraying of the coated pesticides, preferably in aqueous dispersion, over the corresponding plants or agriculturally relevant cultivation land such as, for example, fields, gardens, vineyards, orchards, woods, turf, etc.

On account of their greater stability in aqueous dispersions or suspensions, the coated particles have the advantage that for stabilization there is no need to add emulsifiers, surfactants, solubilizers and comparable auxiliaries, or at least only smaller amounts of such additives need be used.

Especially in the crop protection sector, therefore, the particles of the invention are suitable for eco-friendly delivery in nature to the corresponding plants, the corresponding speed, or the respective areas of land.

The particles of the invention, moreover, also exhibit better rain resistance, since, for example, the coated particles, preferably pesticides, are washed off less rapidly from plants and land areas on account of the improved adhesion.

More uniform delivery and also better and longer adhesion of the particles imply, in agricultural cultivation or in crop protection, a longer, more lasting and broader activity of the pesticides used, and also, in particular, the possibility of using smaller quantities of pesticides without detriment to the resultant effect.

EXAMPLES

1. Production of Inventive Particles with Modified Surface 10 g of Lupasol® WF (BASF SE) were dissolved completely in 300 g of water. 10 g of diamond particles were slowly added to this solution. The resulting suspension was stirred at room temperature at 800 rpm for 3 hours, using a rod stirrer or magnetic stirrer. The diamond particles were then allowed to slowly settle in the suspension, and the supernatant solution was carefully decanted off. The remaining suspension was filtered with a suction filter. The filter cake was washed with water until the filtrate gave a neutral pH. In the present test, preferably, the filter cake was additionally dried at 70° C. and 100 mbar, or alternatively at 2 mbar, for 5 hours.

2. Performance Investigations

Zeta Potential Measurement

The zeta potential of the aqueous suspensions of boron nitride, silicon carbide, diamond, deltamethrin and azoxystrobin powders, all produced in analogy to the example above, was determined as follows. The measurement took place with a Coulter DELSA 440 SX instrument. It is found that the untreated particles have a negative surface charge, whereas the inventively treated particles have undergone charge reversal and have a positive charge. This reversal of the original surface charge was verified for the inventive particles by the experimental measurements below.

| Test | Particles ($d_{50}$) [μm] | Manufacturer | Polymer for coating | pH | Zeta potential [mV] |
|---|---|---|---|---|---|
| CE1 | Diamond; 13.3 μm | Medidia | — | 2.5 | −36 |
| IE1 | Diamond; 13.3 μm | Medidia | Lupasol ® WF | 2.5 | +73 |
| IE2 | Diamond; 13.3 μm | Medidia | Lupasol ® G35 | 2.5 | +65 |
| CE2 | SiC; 8.5 μm | Washington Mills | — | 4 | −58 |
| IE3 | SiC; 8.5 μm | Washington Mills | Lupasol ® HF | 4 | +72 |
| CE3 | Diamond; 14.6 μm | Ceratonia | — | 4 | −88 |
| CE4 | Diamond; 14.6 μm | Ceratonia | Polymer A | 4 | +40 |
| IE4 | Diamond; 14.6 μm | Ceratonia | Lupasol ® WF | 4 | +88 |
| IE5 | Diamond; 14.6 μm | Ceratonia | Lupamin ® 1595 | 4 | +58 |
| CE5 | Boron nitride; 4.7 μm | ESK | — | 4 | −50 |
| CE6 | Boron nitride; 4.7 μm | ESK | Polymer A | 4 | +24 |
| IE6 | Boron nitride; 4.7 μm | ESK | Lupasol ® WF | 4 | +60 |
| CE7 | Deltamethrin; 90 μm | Interchim | — | 4 | −32 |
| IE7 | Deltamethrin; 90 μm | Interchim | Lupasol ® WF | 4 | +56 |
| CE8 | Azoxystrobin; 220 μm | Helm AG | — | 4 | −36 |
| IE8 | Azoxystrobin; 220 μm | Helm AG | Lupasol ® WF | 4 | +44 |

Lupasol ® WF (BASF SE): nonampholytic, quaternizable polyethyleneimine, $M_w$ (light scattering) 25 000, viscosity (20° C.; mPas, ISO 2555, Brookfield) 200 000.
Lupasol ® G35 (BASF SE): nonampholytic, quaternizable polyethyleneimine, $M_w$ (light scattering) 2000, viscosity (20° C.; mPas, ISO 2555, Brookfield) 600.
Lupasol ® HF (BASF SE): nonampholytic, quaternizable polyethyleneimine, $M_w$ (light scattering), viscosity (20° C.; mPas, ISO 2555, Brookfield) 11 000.
Lupamin ® 1595 (BASF SE): nonampholytic, quaternizable polyethyleneimine, $M_w$ (light scattering) <10 000 g/mol.
Polymer A (not inventive): ampholytic terpolymer based on the following monomers: NIPAM (8 mol, 49 wt %), MAPTAC (3 mol, 36 wt %), acrylic acid (1 mol, 4 wt %), AMPS (1 mol, 11 wt %), molar mass = 100 000 g/mol.

Electroplating Test

The particles produced in the experiments above and modified with the nonampholytic polymer were subsequently tested in a chemical electroplating as follows:

The experiment was performed using a chemical nickel electrolyte based on hypophosphite (Enigma 1614, from Kampschulte).

The batch was selected as follows: 7.2 vol % Enigma 1614 part A, 20 vol % Enigma 1614 part B, remainder demineralized water.

Reaction conditions selected were the following parameters: the procedure took place with a batch comprising a volume of 900 ml. The reaction conditions were a pH (at room temperature) of 4.8, a temperature of 90° C., and a reaction time of 40 minutes.

For the deposition, for example, 1 g/l of diamond particles having an average particle size ($d_{50}$) of 8 to 12 μm were reacted in a nickel sulfamate electrolyte. The current density was 5 A/dm$^2$.

The duration of electrodeposition was 7 min. During deposition, gentle stirring was carried out, producing a nickel layer having a thickness of 7 μm. The subsequent analysis of the deposited nickel layer by scanning electron microscopy showed virtually no accumulation of the unmodified particles in the nickel layer (see FIG. 1A).

In contrast, the scanning electron micrograph for the deposition of the particles treated with the nonampholytic, quaternizable polymer (Lupasol® WF; BASF SE), under the same experimental conditions, shows a denser and more uniform deposition of the diamond particles in the nickel layer deposited (see FIG. 1B).

3. Production of Polyethyleneimine (PEI)-Treated Crop Protection Formulations

Example formulations 5-19 from table 1 below were shaken for 120 minutes in an LAU disperser model DAS H [/A] 200-K.

The suspension concentrates (SCs) had the following composition (wt %):

| | |
|---|---|
| AI (active ingredient) | 25% |
| Dispersant | 2.5% |
| PEI | 0.25-2.5% |
| Water, deionized (pH = 9) | bal. to 100% |

Optionally 0.2% of defoamer (Agnique® ST 2434) was added.

40 g of each SC were then ground with 80 g of glass beads (d=3 mm) in a 100 ml Teflon bottle in the LAU disperser for 90 minutes (150 minutes for boscalid) with cooling at setting 2, and the beads were subsequently removed immediately by sieving.

After 24 hours, the particle size distribution was determined on a Malvern Mastersizer 3000.

The associated zeta potentials are listed in table 1 below. They demonstrate the reversal of the charge of the PEI-treated particles and formulations.

Examples 1-4 are commercial suspension concentrates treated in analogy to examples 5-19.

TABLE 1

| Ex. | SC/active ingredient | Manu-facturer | Particle size (d50) [pm] | Dispersant | Polymer for coating | Polymer relative to active ingredient [wt %] | Zeta potential (pH = 4) [mV] |
|---|---|---|---|---|---|---|---|
| 1 | Cantus Gold ® | BASF | 2.0 | — | — | — | −51 |
| 2 | Cantus Gold ® | BASF | 2.0 | — | Lupasol ® WF | 10 | 46 |
| 3 | Ortiva ® | Syngenta | 2.0 | — | — | — | −52 |
| 4 | Ortiva ® | Syngenta | 2.0 | — | Lupasol ® WF | 10 | 49 |
| 5 | Tebuconazole | | 2.2 | Pluronic ® PE 10500 | — | — | −35 |
| 6 | Tebuconazole | | 2.2 | Pluronic ® PE 10500 | Lupasol ® WF | 10 | 23 |
| 7 | Chlorothalonil | | 1.3 | Pluronic ® PE 10500 | — | — | -32 |
| 8 | Chlorothalonil | | 1.3 | Pluronic ® PE 10500 | Lupasol ® FG | 10 | 34 |
| 9 | Chlorothalonil | | 1.3 | Pluronic ® PE 10500 | Lupasol ® G100 | 10 | 43 |
| 10 | Chlorothalonil | | 1.3 | Pluronic ® PE 10500 | Lupasol ® WF | 10 | 45 |
| 11 | Chlorothalonil | | 1.3 | Pluronic ® PE 10500 | Lupasol ® PS | 10 | 44 |
| 12 | Azoxystrobin | | 1.7 | Pluronic ® PE 10500/ Tamol ® NN8906 | — | — | −52 |
| 13 | Azoxystrobin | | 1.7 | Pluronic ® PE 10500/ Tamol ® NN8906 | Lupasol ® WF | 1 | −49 |
| 14 | Azoxystrobin | | 1.7 | Pluronic ® PE 10500/ Tamol ® NN8906 | Lupasol ® WF | 4 | 23 |
| 15 | Azoxystrobin | | 1.7 | Pluronic ® PE 10500/ Tamol ® NN8906 | Lupasol ® WF | 7 | 43 |
| 16 | Boscalid | | 2.1 | Pluronic ® PE 10500 | — | — | −22 |
| 17 | Boscalid | | 2.1 | Pluronic ® PE 10500 | Lupasol ® WF | 1 | 8 |
| 18 | Boscalid | | 2.1 | Pluronic ® PE 10500 | Lupasol ® WF | 4 | 14 |

TABLE 1-continued

| Ex. | SC/active ingredient | Manufacturer | Particle size (d50) [pm] | Dispersant | Polymer for coating | Polymer relative to active ingredient [wt %] | Zeta potential (pH = 4) [mV] |
|---|---|---|---|---|---|---|---|
| 19 | Boscalid | | 2.1 | Pluronic ® PE 10500 | Lupasol ® WF | 7 | 14 |

4. Analysis of Rain Resistance

To determine the rain resistance, the examples set out in table 2 below were tested in accordance with the protocol specified below:

TABLE 2

| Ex. | SC/active ingredient | Active ingredient content [wt %] | Polymer for coating | Polymer relative to active ingredient [wt %] | Immersion time [min] | Rainfastness; residue (average) [%] |
|---|---|---|---|---|---|---|
| 3 | Ortiva ® | 10 | — | — | 10 | 23.2 |
| 4 | Ortiva ® | 10 | Lupasol ® WF | 10 | 10 | 69.7 |
| 7 | Chlorothalonil | 25 | — | — | 5 | 36.2 |
| 8 | Chlorothalonil | 25 | Lupasol ® FG | 10 | 5 | 84.4 |
| 9 | Chlorothalonil | 25 | Lupasol ® G100 | 10 | 5 | 86.5 |
| 10 | Chlorothalonil | 25 | Lupasol ® WF | 10 | 5 | 93.1 |
| 11 | Chlorothalonil | 25 | Lupasol ® PS | 10 | 5 | 94.2 |

Method:

Parafilm® strips (from Bemis Flexible Packaging, Neenah, Wis. 54956, USA) with dimensions of 70×90 mm are fastened using adhesive tape to aluminum panels, dried to constant weight with an airstream of 45° C./250 l/h (<10% relative humidity), cooled in a desiccator, and tared (t). 20 drops of the examples described in table 2 above (in total: 200 µl) are applied to the Parafilm® with equal spacing, followed by 8 h of drying, cooling in a desiccator (see above) and weighing (b1).

The panels are then immersed individually for a defined time in a waterbath (pH=6.4), dried for 8 hours, cooled (see above), and weighed (b2).

The residue is calculated according to the following formula:

$$n1 = b1 - t$$

$$n2 = b2 - t$$

$$\text{residue} = n2 \times 100 / n1$$

It was possible to demonstrate that the PEI-treated samples adhere more effectively to the Parafilm®, which has surface properties of similar hydrophobicity to plant leaves.

5. Uniformity of Delivery in a Greenhouse Trial

To demonstrate the better distribution of the treated suspension concentrates on delivery, a greenhouse trial was carried out using examples 1-4. The results are summarized in table 3 below. It is found that the PEI-treated samples exhibit improved activity, or lower infestation.

TABLE 3

| Ex. | SC/active principle | Polymer for coating | Polymer relative to active ingredient [wt %] | Dosage [g/ha] | Plant | Fungal disease | Infestation (2 WAT, average) [%] |
|---|---|---|---|---|---|---|---|
| 1 | Cantus Gold ®/ protective | — | — | 0.5 | Oilseed rape | alternaria brassicicola | 61.3 |
| 2 | Cantus Gold ®/ protective | Lupasol ® WF | 10 | 0.5 | Oilseed rape | alternaria brassicicola | 34.8 |
| 3 | Ortiva ®/ protective | — | — | 1.25 | Barley | blunneria graminis fomnae speciales hordei (strain 6A) | 32.7 |
| 3 | Ortiva ®/ protective | — | — | 2.5 | Barley | blunneria graminis fomnae speciales hordei (strain 6A) | 24.0 |

TABLE 3-continued

| Ex. | SC/active principle | Polymer for coating | Polymer relative to active ingredient [wt %] | Dosage [g/ha] | Plant | Fungal disease | Infestation (2 WAT, average) [%] |
|---|---|---|---|---|---|---|---|
| 3 | Ortiva ®/ protective | — | — | 5.0 | Barley | blunneria graminis fomnae speciales hordei (strain 6A) | 3.7 |
| 4 | Ortiva ®/ protective | Lupasol ® WF | 10 | 1.25 | Barley | blunneria graminis fomnae speciales hordei (strain 6A) | 14.0 |
| 4 | Ortiva ®/ protective | Lupasol ® WF | 10 | 2.5 | Barley | blunneria graminis fomnae speciales hordei (strain 6A) | 10.7 |
| 4 | Ortiva ®/ protective | Lupasol ® WF | 10 | 5.0 | Barley | blunneria graminis fomnae speciales hordei (strain 6A) | 2.7 |

The procedure here was as follows:

Protective test with Cantus Gold® against *alternaria brassicicola*

Oilseed rape ("Linus" variety) was cultivated for 6 weeks in Frustorfer earth (specialty mixture "fine"). Using this mixture ensures particularly uniform emergence of the trial plants. Inoculation of the leaves with *alternaria brassicicola* took place 4 hours after application of the trial products (protective application). For the inoculation, rapeseed leaves of equal size and equal age were taken. A section of mycelium, extracted with a sterile cork borer from a 14-day-old culture of *Sclerotinia* on potato dextrose agar, was applied to the base of these leaves. The trial was designed as a leaf segment test, with the rapeseed leaves plated out onto benzimidazole agar (0.5% agar, admixing of 40 ppm benzimidazole after autoclaving). The incubation time was 2 WAT (weeks after treatment). Four rapeseed leaves were plated out on each Petri dish (from Greiner, square shape, 15 cm diameter). For each test element, 2 Petri dishes were used, allowing 8 leaves to be evaluated per test element.

The concentration of Cantus Gold for foliar application was set, on the basis of a preliminary test, at 50 g/ha, in order to ensure that the effect was still suboptimal, allowing differentiation of the activity of the Lupasol® WF used for coating. Evaluation of the effect against *alternaria* was made by estimating the leaf infestation on a percentage scale in steps of ten from 0-100%.

Protective test with Ortiva® (azoxystrobin active ingredient content about 23%) against BPM Barley plants (3 plants/pot) were cultured for three weeks in Frustorfer earth (specialty mixture "fine"). This mixture ensures particularly uniform emergence of the trial plants. The inoculation of the leaves with mildew took place 4 hours after application of the trial products (protective application). Inoculation was carried out using fresh conidia of *Blumeria graminis* f. sp. *hordei* (strain A6), which were applied to the leaves by wind distribution in the mildew tower. For a leaf segment test, leaf segments 10 cm long, beginning from the base of the stem, were cut off, and 15 leaves each of the youngest and second-youngest leaf were plated out onto benzimidazole agar (0.5% agar, admixing of 40 ppm benzimidazole after autoclaving).

The concentration of azoxystrobin for a foliar application was set at 5 g/ha. Evaluation of the mildew activity took place by counting of the mildew pustules per leaf over a leaf length of 7 cm. Scoring took place after 2 WAT.

The invention claimed is:

1. A solid particle consisting of a solid pesticide particle and a nonampholytic, quaternizable polymer which is water-soluble at 20° C. coated on the surface thereof, wherein the polymer is selected from the group consisting of polyethyleneimines, polypropyleneimines, and mixtures thereof.

2. The solid particle according to claim 1, wherein the solid organic pesticide particle has a diameter of between 10 and 0.00001 mm.

3. The solid particle according to claim 1, wherein the solid pesticide particle consists of an organic pesticide.

4. A method of dispersing particles in a liquid, the method comprising:
dispersing the particles of claim 1 in a liquid medium.

5. The method according to claim 4, wherein the particles have a diameter of between 10 and 0.00001 mm.

6. A method of using particles according to claim 1, the method comprising using the particles in an organic solvent, in a crop protection formulation, or for a treatment of a seed, a plant, or soil.

* * * * *

UNITED STATES PATENT AND TRADEMARK OFFICE
CERTIFICATE OF CORRECTION

| | | |
|---|---|---|
| PATENT NO. | : 10,899,932 B2 | Page 1 of 1 |
| APPLICATION NO. | : 15/521509 | |
| DATED | : January 26, 2021 | |
| INVENTOR(S) | : Seelmann-Eggebert et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 134 days.

Signed and Sealed this
Fourteenth Day of February, 2023

*Katherine Kelly Vidal*

Katherine Kelly Vidal
*Director of the United States Patent and Trademark Office*